(12) United States Patent
Moskowitz

(10) Patent No.: US 8,281,140 B2
(45) Date of Patent: *Oct. 2, 2012

(54) OPTIMIZATION METHODS FOR THE INSERTION, PROTECTION, AND DETECTION OF DIGITAL WATERMARKS IN DIGITAL DATA

(75) Inventor: Scott A. Moskowitz, Sunny Isles Beach, FL (US)

(73) Assignee: Wistaria Trading, Inc, Sunny Isles Beach, FL (US)

( * ) Notice: Subject to any disclaimer, the term of this patent is extended or adjusted under 35 U.S.C. 154(b) by 246 days.

This patent is subject to a terminal disclaimer.

(21) Appl. No.: 12/592,331

(22) Filed: Nov. 23, 2009

(65) Prior Publication Data

US 2010/0077220 A1    Mar. 25, 2010

Related U.S. Application Data

(60) Continuation of application No. 11/599,964, filed on Nov. 15, 2006, now Pat. No. 7,647,502, which is a continuation of application No. 11/497,822, filed on Aug. 2, 2006, now Pat. No. 7,457,962, which is a division of application No. 09/789,711, filed on Feb. 22, 2001, now Pat. No. 7,107,451, which is a continuation-in-part of application No. 09/281,279, filed on Mar. 30, 1999, now Pat. No. 6,522,767, which is a continuation of application No. 08/677,435, filed on Jul. 2, 1996, now Pat. No. 5,889,868.

(51) Int. Cl.
    *H04L 9/00* (2006.01)
(52) U.S. Cl. ........................................ 713/176
(58) Field of Classification Search .................... 713/176
    See application file for complete search history.

(56) References Cited

U.S. PATENT DOCUMENTS

| | | |
|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Jones et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,111,530 A | 5/1992 | Kutaragi |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |

(Continued)

FOREIGN PATENT DOCUMENTS

EP    0372601    6/1990

(Continued)

OTHER PUBLICATIONS

Schneier, Bruce, Applied Cryptography, 2nd Ed., John Wiley & Sons, pp. 9-10, 1996.

(Continued)

*Primary Examiner* — Matthew Smithers

(74) *Attorney, Agent, or Firm* — Neifeld IP Law, PC

(57) ABSTRACT

Disclosed herein are methods and systems for encoding digital watermarks into content signals. Also disclosed are systems and methods for detecting and/or verifying digital watermarks in content signals. According to one embodiment, a system for encoding of digital watermark information includes: a window identifier for identifying a sample window in the signal; an interval calculator for determining a quantization interval of the sample window; and a sampler for normalizing the sample window to provide normalized samples. According to another embodiment, a system for pre-analyzing a digital signal for encoding at least one digital watermark using a digital filter is disclosed. According to another embodiment, a method for pre-analyzing a digital signal for encoding digital watermarks comprises: (1) providing a digital signal; (2) providing a digital filter to be applied to the digital signal; and (3) identifying an area of the digital signal that will be affected by the digital filter based on at least one measurable difference between the digital signal and a counterpart of the digital signal selected from the group consisting of the digital signal as transmitted, the digital signal as stored in a medium, and the digital signal as played backed. According to another embodiment, a method for encoding a watermark in a content signal includes the steps of (1) splitting a watermark bit stream; and (2) encoding at least half of the watermark bit stream in the content signal using inverted instances of the watermark bit stream. Other methods and systems for encoding/decoding digital watermarks are also disclosed.

20 Claims, No Drawings

U.S. PATENT DOCUMENTS

| | | |
|---|---|---|
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,327,520 A | 7/1994 | Chen |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,617,506 A | 4/1997 | Burk |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,646,997 A | 7/1997 | Barton |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,675,653 A | 10/1997 | Nelson |
| 5,677,952 A | 10/1997 | Blakley et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Magnotti et al. |
| 5,754,697 A | 5/1998 | Fu et al. |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,781,184 A | 7/1998 | Wasserman |
| 5,790,677 A | 8/1998 | Fox et al. |
| 5,799,083 A | 8/1998 | Brothers et al. |
| 5,809,139 A | 9/1998 | Girod et al. |
| 5,809,160 A | 9/1998 | Powell et al. |
| 5,818,818 A | 10/1998 | Soumiya |
| 5,822,432 A | 10/1998 | Moskowitz et al. |
| 5,828,325 A | 10/1998 | Wolose Wicz et al. |
| 5,832,119 A | 11/1998 | Rhoads |
| 5,839,100 A | 11/1998 | Wegener |
| 5,842,213 A | 11/1998 | Odom |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,870,474 A | 2/1999 | Wasilewski et al. |
| 5,884,033 A | 3/1999 | Duvall et al. |
| 5,889,868 A | 3/1999 | Moskowitz et al. |
| 5,893,067 A | 4/1999 | Bender et al. |
| 5,894,521 A | 4/1999 | Conley |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein et al. |
| 6,088,455 A | 7/2000 | Logan et al. |
| 6,131,162 A | 10/2000 | Yoshiura et al. |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,178,405 B1 | 1/2001 | Ouyang |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florencio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 | 5/2001 | Senoh |
| 6,263,313 B1 | 7/2001 | Milstead et al. |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |

| | | | | | | |
|---|---|---|---|---|---|---|
| 6,330,335 | B1 | 12/2001 | Rhoads | 6,990,453 B2 | 1/2006 | Wang |
| 6,330,672 | B1 | 12/2001 | Shur | 7,007,166 B1 | 2/2006 | Moskowitz et al. |
| 6,345,100 | B1 | 2/2002 | Levine | 7,020,285 B1 | 3/2006 | Kirovski et al. |
| 6,351,765 | B1 | 2/2002 | Pietropaolo et al. | 7,035,049 B2 | 4/2006 | Yamamoto |
| 6,363,483 | B1 | 3/2002 | Keshav | 7,035,409 B1 | 4/2006 | Moskowitz |
| 6,373,892 | B1 | 4/2002 | Ichien et al. | 7,043,050 B2 | 5/2006 | Yuval |
| 6,373,960 | B1 | 4/2002 | Conover et al. | 7,046,808 B1 | 5/2006 | Metois et al. |
| 6,374,036 | B1 | 4/2002 | Ryan et al. | 7,050,396 B1 | 5/2006 | Cohen et al. |
| 6,377,625 | B1 | 4/2002 | Kim | 7,051,208 B2 | 5/2006 | Venkatesan et al. |
| 6,381,618 | B1 | 4/2002 | Jones et al. | 7,058,570 B1 | 6/2006 | Yu et al. |
| 6,381,747 | B1 | 4/2002 | Wonfor et al. | 7,093,295 B1 | 8/2006 | Saito |
| 6,385,324 | B1 | 5/2002 | Koppen | 7,095,874 B2 | 8/2006 | Moskowitz et al. |
| 6,385,329 | B1 | 5/2002 | Sharma et al. | 7,103,184 B2 | 9/2006 | Jian |
| 6,385,596 | B1 | 5/2002 | Wiser | 7,107,451 B2 | 9/2006 | Moskowitz |
| 6,389,538 | B1 | 5/2002 | Gruse et al. | 7,123,718 B1 | 10/2006 | Moskowitz et al. |
| 6,398,245 | B1 | 6/2002 | Gruse | 7,127,615 B2 | 10/2006 | Moskowitz |
| 6,405,203 | B1 | 6/2002 | Collart | 7,150,003 B2 | 12/2006 | Naumovich et al. |
| 6,415,041 | B1 | 7/2002 | Oami et al. | 7,152,162 B2 | 12/2006 | Moskowitz et al. |
| 6,418,421 | B1 | 7/2002 | Hurtado | 7,159,116 B2 | 1/2007 | Moskowitz |
| 6,425,081 | B1 | 7/2002 | Iwamura | 7,162,642 B2 | 1/2007 | Schumann et al. |
| 6,430,301 | B1 | 8/2002 | Petrovic | 7,177,429 B2 | 2/2007 | Moskowitz et al. |
| 6,430,302 | B2 | 8/2002 | Rhoads | 7,177,430 B2 | 2/2007 | Kim |
| 6,442,283 | B1 | 8/2002 | Tewfik et al. | 7,206,649 B2 | 4/2007 | Kirovski et al. |
| 6,446,211 | B1 | 9/2002 | Colvin | 7,231,524 B2 | 6/2007 | Burns |
| 6,453,252 | B1 | 9/2002 | Laroche | 7,233,669 B2 | 6/2007 | Candelore |
| 6,457,058 | B1 | 9/2002 | Ullum et al. | 7,240,210 B2 | 7/2007 | Michak et al. |
| 6,463,468 | B1 | 10/2002 | Buch et al. | 7,266,697 B2 | 9/2007 | Kirovski et al. |
| 6,480,937 | B1 | 11/2002 | Vorbach | 7,286,451 B2 | 10/2007 | Wirtz et al. |
| 6,484,264 | B1 | 11/2002 | Colvin | 7,287,275 B2 | 10/2007 | Moskowitz |
| 6,493,457 | B1 | 12/2002 | Quackenbush | 7,289,643 B2 | 10/2007 | Brunk et al. |
| 6,502,195 | B1 | 12/2002 | Colvin | 7,343,492 B2 | 3/2008 | Moskowitz et al. |
| 6,522,767 | B1 | 2/2003 | Moskowitz et al. | 7,346,472 B1 | 3/2008 | Moskowitz et al. |
| 6,522,769 | B1 | 2/2003 | Rhoads et al. | 7,362,775 B1 | 4/2008 | Moskowitz |
| 6,523,113 | B1 | 2/2003 | Wehrenberg | 7,363,278 B2 | 4/2008 | Schmelzer et al. |
| 6,530,021 | B1 | 3/2003 | Epstein et al. | 7,409,073 B2 | 8/2008 | Moskowitz et al. |
| 6,532,284 | B2 | 3/2003 | Walker et al. | 7,457,962 B2 | 11/2008 | Moskowitz |
| 6,539,475 | B1 | 3/2003 | Cox et al. | 7,460,994 B2 | 12/2008 | Herre et al. |
| 6,557,103 | B1 | 4/2003 | Boncelet, Jr. et al. | 7,475,246 B1 | 1/2009 | Moskowitz |
| 6,584,125 | B1 | 6/2003 | Katto | 7,530,102 B2 | 5/2009 | Moskowitz |
| 6,587,837 | B1 | 7/2003 | Spagna et al. | 7,532,725 B2 | 5/2009 | Moskowitz et al. |
| 6,590,996 | B1 | 7/2003 | Reed | 7,568,100 B1 | 7/2009 | Moskowitz et al. |
| 6,598,162 | B1 | 7/2003 | Moskowitz | 7,647,502 B2 * | 1/2010 | Moskowitz ............ 713/176 |
| 6,606,393 | B1 | 8/2003 | Xie et al. | 7,647,503 B2 | 1/2010 | Moskowitz |
| 6,611,599 | B2 | 8/2003 | Natarajan | 7,664,263 B2 | 2/2010 | Moskowitz |
| 6,647,424 | B1 | 11/2003 | Pearson et al. | 7,743,001 B1 | 6/2010 | Vermeulen |
| 6,658,010 | B1 | 12/2003 | Enns et al. | 7,761,712 B2 | 7/2010 | Moskowitz |
| 6,665,489 | B2 | 12/2003 | Collart | 7,779,261 B2 | 8/2010 | Moskowitz |
| 6,668,246 | B1 | 12/2003 | Yeung et al. | 2001/0010078 A1 | 7/2001 | Moskowitz |
| 6,668,325 | B1 | 12/2003 | Collberg et al. | 2001/0029580 A1 | 10/2001 | Moskowitz |
| 6,674,858 | B1 | 1/2004 | Kimura | 2001/0043594 A1 | 11/2001 | Ogawa et al. |
| 6,687,683 | B1 | 2/2004 | Harada et al. | 2002/0009208 A1 | 1/2002 | Alattar |
| 6,725,372 | B1 | 4/2004 | Lewis et al. | 2002/0010684 A1 | 1/2002 | Moskowitz |
| 6,754,822 | B1 | 6/2004 | Zhao | 2002/0026343 A1 | 2/2002 | Duenke |
| 6,775,772 | B1 | 8/2004 | Binding et al. | 2002/0056041 A1 | 5/2002 | Moskowitz |
| 6,784,354 | B1 | 8/2004 | Lu et al. | 2002/0071556 A1 | 6/2002 | Moskowitz et al. |
| 6,785,815 | B1 | 8/2004 | Serret-Avila et al. | 2002/0073043 A1 | 6/2002 | Herman et al. |
| 6,785,825 | B2 | 8/2004 | Colvin | 2002/0097873 A1 | 7/2002 | Petrovic |
| 6,792,548 | B2 | 9/2004 | Colvin | 2002/0103883 A1 | 8/2002 | Haverstock et al. |
| 6,792,549 | B2 | 9/2004 | Colvin | 2002/0152179 A1 | 10/2002 | Racov |
| 6,795,925 | B2 | 9/2004 | Colvin | 2002/0161741 A1 | 10/2002 | Wang et al. |
| 6,799,277 | B2 | 9/2004 | Colvin | 2003/0002862 A1 | 1/2003 | Rodriguez |
| 6,804,453 | B1 | 10/2004 | Sasamoto | 2003/0126445 A1 | 7/2003 | Wehrenberg |
| 6,813,717 | B2 | 11/2004 | Colvin | 2003/0133702 A1 | 7/2003 | Collart |
| 6,813,718 | B2 | 11/2004 | Colvin | 2003/0200439 A1 | 10/2003 | Moskowitz |
| 6,823,455 | B1 | 11/2004 | Macy et al. | 2003/0219143 A1 | 11/2003 | Moskowitz et al. |
| 6,834,308 | B1 | 12/2004 | Ikezoye et al. | 2004/0028222 A1 | 2/2004 | Sewell et al. |
| 6,842,862 | B2 | 1/2005 | Chow et al. | 2004/0037449 A1 | 2/2004 | Davis et al. |
| 6,853,726 | B1 | 2/2005 | Moskowitz et al. | 2004/0049695 A1 | 3/2004 | Choi et al. |
| 6,857,078 | B2 | 2/2005 | Colvin | 2004/0059918 A1 | 3/2004 | Xu |
| 6,865,747 | B1 | 3/2005 | Mercier | 2004/0083369 A1 | 4/2004 | Erlingsson et al. |
| 6,931,534 | B1 | 8/2005 | Jandel et al. | 2004/0086119 A1 | 5/2004 | Moskowitz |
| 6,950,941 | B1 | 9/2005 | Lee | 2004/0093521 A1 | 5/2004 | Hamadeh et al. |
| 6,957,330 | B1 | 10/2005 | Hughes | 2004/0117628 A1 | 6/2004 | Colvin |
| 6,966,002 | B1 | 11/2005 | Torrubia-Saez | 2004/0117664 A1 | 6/2004 | Colvin |
| 6,977,894 | B1 | 12/2005 | Achilles et al. | 2004/0125983 A1 | 7/2004 | Reed et al. |
| 6,978,370 | B1 | 12/2005 | Kocher | 2004/0128514 A1 | 7/2004 | Rhoads |
| 6,983,058 | B1 | 1/2006 | Fukuoka | 2004/0225894 A1 | 11/2004 | Colvin |
| 6,983,337 | B2 | 1/2006 | Diamant | 2004/0243540 A1 | 12/2004 | Moskowitz et al. |
| 6,986,063 | B2 | 1/2006 | Colvin | 2005/0135615 A1 | 6/2005 | Moskowitz et al. |

| | | | |
|---|---|---|---|
| 2005/0160271 A9 | 7/2005 | Brundage et al. | |
| 2005/0177727 A1 | 8/2005 | Moskowitz et al. | |
| 2005/0246554 A1 | 11/2005 | Batson | |
| 2006/0005029 A1 | 1/2006 | Petrovic et al. | |
| 2006/0013395 A1 | 1/2006 | Brundage et al. | |
| 2006/0013451 A1 | 1/2006 | Haitsma | |
| 2006/0041753 A1 | 2/2006 | Haitsma | |
| 2006/0101269 A1 | 5/2006 | Moskowitz et al. | |
| 2006/0140403 A1 | 6/2006 | Moskowitz | |
| 2006/0251291 A1 | 11/2006 | Rhoads | |
| 2006/0285722 A1 | 12/2006 | Moskowitz et al. | |
| 2007/0011458 A1 | 1/2007 | Moskowitz | |
| 2007/0028113 A1 | 2/2007 | Moskowitz | |
| 2007/0064940 A1 | 3/2007 | Moskowitz et al. | |
| 2007/0079131 A1 | 4/2007 | Moskowitz et al. | |
| 2007/0083467 A1 | 4/2007 | Lindahl et al. | |
| 2007/0110240 A1 | 5/2007 | Moskowitz et al. | |
| 2007/0113094 A1 | 5/2007 | Moskowitz et al. | |
| 2007/0127717 A1 | 6/2007 | Herre et al. | |
| 2007/0226506 A1 | 9/2007 | Moskowitz | |
| 2007/0253594 A1 | 11/2007 | Lu et al. | |
| 2007/0294536 A1 | 12/2007 | Moskowitz et al. | |
| 2007/0300072 A1 | 12/2007 | Moskowitz | |
| 2007/0300073 A1 | 12/2007 | Moskowitz | |
| 2008/0005571 A1 | 1/2008 | Moskowitz | |
| 2008/0005572 A1 | 1/2008 | Moskowitz | |
| 2008/0016365 A1 | 1/2008 | Moskowitz | |
| 2008/0022113 A1 | 1/2008 | Moskowitz | |
| 2008/0022114 A1 | 1/2008 | Moskowitz | |
| 2008/0028222 A1 | 1/2008 | Moskowitz | |
| 2008/0046742 A1 | 2/2008 | Moskowitz | |
| 2008/0075277 A1 | 3/2008 | Moskowitz et al. | |
| 2008/0109417 A1 | 5/2008 | Moskowitz | |
| 2008/0133927 A1 | 6/2008 | Moskowitz et al. | |
| 2008/0151934 A1 | 6/2008 | Moskowitz et al. | |
| 2009/0037740 A1 | 2/2009 | Moskowitz | |
| 2009/0089427 A1 | 4/2009 | Moskowitz et al. | |
| 2009/0190754 A1 | 7/2009 | Moskowitz et al. | |
| 2009/0210711 A1 | 8/2009 | Moskowitz | |
| 2009/0220074 A1 | 9/2009 | Moskowitz et al. | |
| 2010/0002904 A1 | 1/2010 | Moskowitz | |
| 2010/0005308 A1 | 1/2010 | Moskowit | |
| 2010/0029580 A1 | 2/2010 | Robbins et al. | |
| 2010/0064140 A1 | 3/2010 | Moskowitz | |
| 2010/0077219 A1 | 3/2010 | Moskowitz | |
| 2010/0077220 A1 | 3/2010 | Moskowitz | |
| 2010/0098251 A1 | 4/2010 | Moskowitz | |
| 2010/0106736 A1 | 4/2010 | Moskowitz | |
| 2010/0153734 A1 | 6/2010 | Moskowitz | |
| 2010/0182570 A1 | 7/2010 | Matsumoto et al. | |
| 2010/0202607 A1 | 8/2010 | Moskowitz | |
| 2010/0220861 A1 | 9/2010 | Moskowitz | |

FOREIGN PATENT DOCUMENTS

| | | |
|---|---|---|
| EP | 0372601 A1 | 6/1990 |
| EP | 0565947 | 10/1993 |
| EP | 0565947 A1 | 10/1993 |
| EP | 0581317 | 2/1994 |
| EP | 0581317 A2 | 2/1994 |
| EP | 0649261 | 4/1995 |
| EP | 0651554 | 5/1995 |
| EP | 0651554 A | 5/1995 |
| EP | 0872073 | 7/1996 |
| EP | 1547337 | 3/2006 |
| EP | 1354276 | 12/2007 |
| EP | 1354276 B1 | 12/2007 |
| NL | 100523 | 9/1998 |
| NL | 1005523 | 9/1998 |
| WO | WO 95/14289 | 5/1995 |
| WO | WO 9514289 | 5/1995 |
| WO | WO9701892 | 6/1995 |
| WO | WO 96/29795 | 9/1996 |
| WO | WO 9629795 | 9/1996 |
| WO | WO 9642151 | 12/1996 |
| WO | WO9726733 | 1/1997 |
| WO | WO 97/24833 | 7/1997 |
| WO | WO 9724833 | 7/1997 |
| WO | WO9726732 | 7/1997 |
| WO | WO 9744736 | 11/1997 |
| WO | WO9802864 | 1/1998 |
| WO | WO98/37513 | 8/1998 |
| WO | WO9837513 | 8/1998 |
| WO | WO 9952271 | 10/1999 |
| WO | WO 99/62044 | 12/1999 |
| WO | WO 9962044 | 12/1999 |
| WO | WO 9963443 | 12/1999 |
| WO | WO 0057643 | 9/2000 |
| WO | WO0118628 | 3/2001 |
| WO | WO0143026 | 6/2001 |
| WO | WO0203385 | 1/2002 |
| WO | WO02003385 A1 | 10/2002 |

OTHER PUBLICATIONS

Menezes, Alfred J., Handbook of Applied Crypography, CRC Press, p. 46, 1997.

Merriam-Webster's Collegiate Dictionary, 10th Ed., Merriam Webster, Inc., p. 207, 1996.

Brealy, et al., Principles of Corporate Finance, "Appendix A—Using Option Valuation Models", 1984, pp. 448-449.

Copeland, et al., Real Options:A Practioner's Guide, 2001 pp. 106-107, 201-202, 204-208.

Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html.on.

Crawford, D.W. "Pricing Network Usage:A Market for Bandwith of Market Communication?" presented MIT Workshop on Internet Economics, Mar. 1995 http://www press vmich edu/iep/works/CrawMarket html on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceed of reliable IT systems, v15 '95, H.H. Bruggemann and W Gerhardt-Hackel (Ed) Viewing Publishing Company Germany 1995.

Zhao, Jian. "A WWW Service to Embed and Prove Digital Copyright Watermarks", Proc. of the european conf. on Mulitmedia Applications, Services & Techniques Louvain-La-Nevve Belgium May 1996.

Gruhl,Daniel et al.,Echo Hiding. In Proceeding of the Workshop on Information Hiding. No. 1174 in Lecture Notes in Computer Science,Cambridge,England (May/Jun. 1996).

Oomen,A.W.J. et al., A Variable Bit Rate Buried Data Channel for Compact Disc, J.Audio Eng.Sc.,vol. 43,No. 1/2,pp. 23-28 (1995).

Ten Kate,W. et al., A New Surround-Stereo—Surround Coding Techniques, J. Audio Eng.Soc.,vol. 40,No. 5,pp. 376-383 (1992).

Gerzon, Michael et al.; A High Rate Buried Data Channel for Audio CD, presentation notes, Audio Engineering Soc. 94th Convention (1993).

Sklar,Bernard, Digital Communications, pp. 601-603 (1988).

Jayant, N.S. et al., Digital Coding of Waveforms, Prentice Hall Inc., Englewood Cliffs,NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

Van Schyndel, et al. A digital Watermark, IEEE Int'l Computer Processing Conference, Austin,TX, Nov. 13-16, 1994, pp. 86-90.

Smith, et al. Modulation and Information Hiding in Images, Springer Verlag, 1st Int'l Workshop, Cambridge, UK, May 30-Jun. 1, 1996, pp. 207-227.

Kutter, Martin et al., Digital Signature of Color Images Using Amplitude Modulation, SPIE-E197, vol. 3022, pp. 518-527.

Puate, Joan et al., Using Fractal Compression Scheme to Embed a Digital Signature into an Image, SPIE-96 Proceedings, vol. 2915, Mar. 1997, pp. 108-118.

Swanson, Mitchell D.,et al., Transparent Robust Image Watermarking, Proc. of the 1996 IEEE Int'l Conf. on Image Processing, vol. 111, 1996, pp. 211-214.

Swanson, Mitchell D. et al. Robust Data Hiding for Images, 7th IEEE Digital Signal Processing Workshop, Leon, Norway. Sep. 1-4, 1996, pp. 37-40.

Zhao, Jian et al., Embedding Robust Labels into Images for Copyright Protection, Proceeding of the Know Right '95 Conference, pp. 242-251.

Koch, E., et al., Towards Robust and Hidden Image Copyright Labeling, 1995 IEEE Workshop on Nonlinear Signal and Image Processing, Jun. 1995 Neos Marmaras pp 4.

Van Schyandel, et al., Towards a Robust Digital Watermark, Second Asain Image Processing Conference, Dec. 6-8, 1995, Singapore, vol. 2, pp. 504-508.

Tirkel,A.Z., A Two-Dimensional Digital Watermark, DICTA '95, Univ. of Queensland, Brisbane, Dec. 5-8, 1995, pp. 7.

Tirkel,A.Z., Image Watermarking—A Spread Spectrum Application, ISSSTA '96, Sept.96, Mainz, German, pp. 6.

O'Ruanaidh, et al. Watermarking Digital Images for Copyright Protection, IEEE Proceedings, vol. 143, No. 4, Aug. 96, pp. 250-256.

Cox, et al., Secure Spread Spectrum Watermarking for Multimedia, NEC Research Institute, Techinal Report 95-10, pp. 33.

Kahn, D., The Code Breakers, The MacMillan Company, 1969, pp. xIII, 81-83,513,515,522-526,873.

Boney, et al., Digital Watermarks for Audio Signals, EVSIPCO, 96, pp. 473-480.

Dept. of Electrical Engineering, Del Ft University of Technology, Del ft The Netherlands,Cr.C. Langelaar et al., Copy Protection for Mulitmedia Data based on Labeling Techniques Jul. 1996 9 pp.

F. Hartung, et al., Digital Watermarking of Raw and Compressed Video, SPIE vol. 2952, pp. 205-213. Oct. 1996.

Craver, et al., Can Invisible Watermarks Resolve Rightful Ownerships? IBM Research Report, RC 20509 (Jul. 25, 1996) 21 pp.

Press, et al., Numerical Recipes in C, Cambridge Univ. Press, 1988, pp. 398-417.

Pohlmann, Ken C., Principles of Digital Audio, 3rd Ed., 1995, pp. 32-37,40-48,138,147-149,332,333,364, 499-501,508-509,564-571.

Pohlmann, Ken C., Principles of Digital Audio, 2nd Ed., 1991, pp. 1-9,19-25,30-33,41-48,54-57,86-107,375-387.

Schneier, Bruce, Applied Cryptography, John Wiley & Sons, inc. , New York,1994, pp. 68,69,387-392,1-57,273-275,321-324.

Boney, et al., Digital Watermarks for Audio Signals, Proceedings of the International Conf. on Multimedia Computing and Systems, Jun. 17-23, 1996,Hiroshima, Japan, 0-8186-7436-9196, pp. 473-480.

Johnson, et al., Transform Permuted Watermarking for Copyright Protection of Digital Video, IEEE Globecom 1998, Nov. 8-12, 1998, NewYork, NewYork, vol. 2, 1998, pp. 684-689, (ISBN 0-7803-4985-7).

Rivest, et al. "Pay Word and Micromint: Two Simple Micropayment Schemes," MIT Laboratory for Computer Science, Cambridge, MA, May 7, 1996 pp. 1-18.

Bender, et al., Techniques for Data Hiding, IBM Systems Journal, vol. 35, Nos. 3 & 4, 1996, pp. 313-336.

Moskowitz, Bandwith as Currency, IEEE Multimedia, Jan.-Mar. 2003, pp. 14-21.

Moskowitz, Multimedia Sedurity Technologies for Digital Rights Management, 2006, Academic Press, "Introduction-Digital Rights Management" pp. 3-22.

Tomsich, et al., "Towards a secure and de-centralized digital watermarking infrastructure for the protection of Intellectual Property", in Electronic Commerce and Web Technologies, Proceedings (ECWEB, 2000.

Moskowitz, "What is Acceptable Quality in the Application of Digital Watermarking: Trade-offs of Security, Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science,2006, (to appear) 13.

Kocher, et al., "Self Protecting Digital Content", Technical Report from the CRI Content Security Research Initiative, Crytography Research, Inc. 2002-2003, 14 pages.

Sirbu, M. et al., "Net Bill: An Internet Commerce System Optimized for Network Delivered Services", Digest of Papers of the Computer Society Computer Conference (Spring), Mar. 5, 1995, pp. 20-25, vol. CONF40.

Schunter, M. et al., "A Status Report on the SEMPER framework for Sedure Electronic Commerce", Computer Networks and ISDN Systems, Sep. 30, 1998 pp. 1501-1510 vol. 30 No. 16-18 NL North Holland.

Konrad, K. et al., "Trust and Elecronic Commerce—more than a techinal problem," Proceedings of the 18th IEEE Symposium on Reliable Distributed Systems Oct. 19-22, 1999 pp. 360-365 Lausanne.

Kini, a. et al., "Trust in Electronic Commerce: Definition and Theoretical Considerations", Proceedings of the 31st Hawaii Int'l Conf on System Sciences (Cat. No. 98TB1002161), Jan. 6-9, 1998, pp. 51-61. Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.

Rivest,et al., PayWord and MicroMint: Two simple micropayment schemes, MIT Laboratory for Computer Science, Cambridge, MA 02139, Apr. 27, 2001, pp. 1-18.

Horowitz, et al., The Art of Electronics, 2nd Ed., 1989, pp. 7.

Delaigle, J.-F., et al. "Digital Watermarking," Proceedings of the SPIE, vol. 2659, Feb. 1, 1996, pp. 99-110 (Abstract).

Schneider, M., et al. "Robust Content Based Digital Signature for Image Authentication," Proceedings of the International Conference on Image Processing (IC Lausanne), Sep. 16-19, 1996, pp. 227-230, IEEE ISBN.

Cox, I. J., et al. "Secure Spread Spectrum Watermarking for Multimedia," IEEE Transactions on Image Processing, vol. 6 No. 12, Dec. 1, 1997, pp. 1673-1686.

Wong, Ping Wah. "A Public Key Watermark for Image Verification and Authentication," IEEE International Conference on Image Processing, vol. 1 Oct. 4-7, 1998 pp. 455-459.

Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.

Ross Anderson, "Stretching the Limits of Steganography," LNCS, vol. 1174, May/Jun. 1996, 10 pages, ISBN: 3-540-61996-8.

Joseph J.K. O'Ruanaidh and Thierry Pun, "Rotation, Scale and Translation Invariant Digital Image Watermarking", pre-publication, Summer 1997 4 pages.

Joseph J.K. O'Ruatiaidh and Thierry Pun, "Rotation, Scale and Translation Invariant Digital Image Watermarking", Submitted to Signal Processing Aug. 21, 1997, 19 pages.

Rivest, R. "Chatting and Winnowing: Confidentiality without Encryption", MIT Lab for Computer Science, http://people.csail.mit.edu/rivest/Chaffing.txt, Apr. 24, 1998, 9 pp.

PortalPlayer, PP502 digital media management system-on-chip, May 1, 2003, 4 pp.

VeriDisc, "The search for a Rational Solution to Digital Rights Management (DRM)", http://64.244.235.240/news/whitepaper/docs/veridisc_white_paper.pdf, 2001; 15 pp.

Cayre, et al., "Kerckhoff's-Based Embedding Security Classes for WOA Data Hiding". IEEE Transactions on Information Forensics and Security, vol. 3 No. 1, Mar. 2008, 15 pp.

Wayback Machine, dated Jan. 17, 1999, http://web.archive.org/web/19990117020420/http://www.netzero.com/, accessed on Feb. 19, 2008.

Namgoong, H., "An Integrated Approach to Legacy Data for Multimedia Applications", Proceedings of the 23rd EUROMICRO Conference, vol., Issue 1-4, Sep. 1997 pp. 387-391.

Wayback Machine, dated Aug. 26, 2007, http://web.archive.org/web/20070826151732/http://www.screenplaysmag.com/tabid/96/articleType/ ArticleView/articleId/495/Default.aspx/.

"YouTube Copyright Policy: Video Identification tool—YouTube Help", accessed Jun. 4, 2009, http://www.google.com/support/youtube/bin/answer.py?h1=en&answer=83766, 3 pp.
PCT International Search Report, completed Sep. 13, 1995; authorized officer Huy D. Vu (PCT/US95/08159) (2 pages).
PCT International Search Report, completed Jun. 11, 1996; authorized officer Salvatore Cangialosi (PCT/US96/10257) (4 pages).
Supplementary European Search Report, completed Mar. 5, 2004; authorized officer J. Hazel (EP 96 91 9405) (1 page).
PCT International Search Report, completed Apr. 4, 1997; authorized officer Bernarr Earl Gregory (PCT/US97/00651) (1 page).
PCT International Search Report, completed May 6, 1997; authorized officer Salvatore Cangialosi (PCT/US97/00652) (3 pages).
PCT International Search Report, completed Oct. 23, 1997; authorized officer David Cain (PCT/US97/11455) (1 page).
PCT International Search Report; completed Jul. 12, 1999; authorized officer R. Hubeau (PCT/US99/07262) (3 pages).
PCT International Search Report, completed Jun. 30, 2000; authorized officer Paul E. Callahan (PCT/US00/06522) (7 pages).
Supplementary European Search Report, completed Jun. 27, 2002; authorized officer M. Schoeyer (EP 00 91 9398) (1 page).
PCT International Search Report, date of mailing Mar. 15, 2001; authorized officer Maria Brouwers (PCT/US00/18411) (5 pages).
PCT International Search Report, completed Jul. 20, 2001; authorized officer A. Sigolo (PCT/US00/18411) (5 pages).
PCT International Search Report, completed Mar. 20, 2001; authorized officer P. Corcoran (PCT/US00/33126) (6 pages).
PCT International Search Report, completed Jan. 26, 2001; authorized officer G. Parron (PCT/US00/21189) (3 pages).
European Search Report, completed Oct. 15, 2007; authorized officer James Hazel (EP 07 11 2420) (9 pages).
Staind (The Singles 1996-2006), Warner Music—Atlantic, Pre-Release CD image, 2006, 1 page.
Arctic Monkeys (Whatever People Say I Am, That's What I'm Not), Domino Recording Co. Ltd., Pre-Release CD image, 2005, 1 page.
Radiohead ("Hail to The Thief"), EMI Music Group—Capitol, Pre-Release CD image, 2003, 1 page.
OASIS (Dig Out Your Soul), Big Brother Recordings Ltd., Promotion CD image, 2009, 1 page.
EPO Application No. 96919405.9, entitled "Steganographic Method and Device"; published as EP0872073 (A2), Oct. 21, 1998.
Jap. App. No. 2000-542907, entitled "Multiple Transform Utilization and Application for Secure Digital Watermarking"; which is a JP national stage of PCT/US1999/007262, published as WO/1999/052271, Oct. 14, 1999.
PCT Application No. PCT/US00/21189, filed Aug. 4, 2000, entitled, "A Secure Personal Content Server", Pub. No. WO/2001/018628 ; Publication Date: Mar. 15, 2001.
Menezes, Alfred J., Handbook of Applied Cryptography, CRC Press, p. 46, 1997.
Merriam-Webster's Collegiate Dictionary, 10th Ed., Merriam Webster, Inc., p. 207.
Copeland, et al., Real Options: A Practitioner's Guide, 2001 pp. 106-107, 201-202, 204-208.
Sarkar, M. "An Assessment of Pricing Mechanisms for the Internet—A Regulatory Imperative", presented MIT Workshop on Internet Economics, Mar. 1995 http://www.press.vmich.edu/iep/works/SarkAsses.html on.
Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.
Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.
1996 Zhao, Jian. "A WWW Service to Embed and Prove Digital Copyright Watermarks", Proc. of the European conf. on Multimedia Applications, Services & Techniques Louvain-La-Nevve Belgium May 1996.
Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.AudioEng. Sc., vol. 43, No. 1/2, pp. 23-28 (1995).
Ten Kate, W. et al., A New Surround-Stereo-Surround Coding Techniques, J. Audio Eng.Soc., vol. 40, No. 5,pp. 376-383 (1992).
Gerzon, Michael et al., A High Rate Buried Data Channel for Audio CD, presentation notes, Audio Engineering Soc. 94th Convention (1993).
Sklar, Bernard, Digital Communications, pp. 601-603 (1988).
Jayant, N.S. et al., Digital Coding of Waveforms, Prentice Hall Inc., Englewood Cliffs, NJ, pp. 486-509 (1984).
Van Schyndel, et al., "A digital Watermark," IEEE Int'l Computer Processing Conference, Austin,TX, Nov. 13-16, 1994, pp. 86-90.
Smith, et al. "Modulation and Information Hiding in Images", Springer Verlag, 1st Int'l Workshop, Cambridge, UK, May 30-Jun. 1, 1996, pp. 207-227.
1997, Kutter, Martin et al., "Digital Signature of Color Images Using Amplitude Modulation", SPIE—E197, vol. 3022, pp. 518-527.
Puate, Joan et al., "Using Fractal Compression Scheme to Embed a Digital Signature into an Image", SPIE—96 Proceedings, vol. 2915, Mar. 1997, pp. 108-118.
Swanson, Mitchell D.,et al., "Transparent Robust Image Watermarking", Proc. of the 1996 IEEE Int'l Conf. on Image Processing, vol. 111, 1996 , pp. 211-214.
Swanson, Mitchell D., et al. "Robust Data Hiding for Images", 7th IEEE Digital Signal Processing Workshop, Leon, Norway. Sep. 1-4, 1996, pp. 37-40.
Zhao, Jian et al., "Embedding Robust Labels into Images for Copyright Protection", Proceeding of the Know Right '95 Conference, pp. 242-251.
Koch, E., et al., "Towards Robust and Hidden Image Copyright Labeling", 1995 IEEE Workshop on Nonlinear Signal and Image Processing, Jun. 1995 Neos Marmaras pp. 4.
Van Schyandel, et al., "Towards a Robust Digital Watermark", Second Asain Image Processing Conference, Dec. 6-8, 1995, Singapore, vol. 2, pp. 504-508.
Tirkel,A.Z., "A Two-Dimensional Digital Watermark", DICTA '95, Univ. of Queensland, Brisbane, Dec. 5-8, 1995, pp. 7.
Tirkel,A.Z., "Image Watermarking—A Spread Spectrum Application", ISSSTA '96, Sep. 1996, Mainz, German, pp. 6.
O'Ruanaidh, et al. "Watermarking Digital Images for Copyright Protection", IEEE Proceedings, vol. 143, No. 4, Aug. 1996, pp. 250-256.
Kahn, D., "The Code Breakers", The MacMillan Company, 1969, pp. xIII, 81-83, 513, 515, 522-526, 863.
Boney, et al., Digital Watermarks for Audio Signals, EVSIPCO, 96, pp. 473-480 (Mar. 14, 1997).
Dept. of Electrical Engineering, Del Ft University of Technology, Del ft the Netherlands, Cr.C. Langelaar et al.,"Copy Protection for Multimedia Data based on Labeling Techniques", Jul. 1996 9 pp.
F. Hartung, et al., "Digital Watermarking of Raw and Compressed Video", SPIE vol. 2952, pp. 205-213.
Craver, et al., "Can Invisible Watermarks Resolve Rightful Ownerships?", IBM Research Report, RC 20509 (Jul. 25, 1996) 21 pp.
Press, et al., "Numerical Recipes in C", Cambridge Univ. Press, 1988, pp. 398-417.
Pohlmann, Ken C., "Principles of Digital Audio", 3rd Ed., 1995, pp. 32-37, 40-48:138, 147-149, 332, 333, 364, 499-501, 508-509, 564-571.
Pohlmann, Ken C., "Principles of Digital Audio", 2nd Ed., 1991, pp. 1-9, 19-25, 30-33, 41-48, 54-57, 86-107, 375-387.
Schneier, Bruce, Applied Cryptography, John Wiley & Sons, Inc., New York, 1994, pp. 68, 69, 387-392, 1-57, 273-275, 321-324.
Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.
Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).
Rivest, et al., "Pay Word and Micromint: Two Simple Micropayment Schemes," MIT Laboratory for Computer Science, Cambridge, MA, May 7, 1996 pp. 1-18.
Bender, et al., "Techniques for Data Hiding", IBM Systems Journal, (1996) vol. 35, Nos. 3 & 4,1996, pp. 313-336.

Moskowitz, "Bandwith as Currency", IEEE Multimedia, Jan.-Mar. 2003, pp. 14-21.

Moskowitz, Multimedia Security Technologies for Digital Rights Management, 2006, Academic Press, "Introduction—Digital Rights Management" pp. 3-22.

Rivest, et al., "PayWord and Micromint: Two Simple Micropayment Schemes," MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB)(2000).

Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science 2006 (to appear) 13.

Kocher, et al., "Self Protecting Digital Content", Technical Report from the CRI Content Security Research Initiative, Cryptography Research, Inc. 2002-2003 14 pages.

Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.

Konrad, K. et al., "Trust and Electronic Commerce—more than a technical problem," Proceedings of the 18th IEEE Symposium on Reliable Distributed Systems Oct. 19-22, 1999, pp. 360-365 Lausanne.

Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.

European Search Report & European Search Opinion in EP07112420.

U.S. Appl. No. 60/169,274, filed Dec. 7, 1999, entitled "Systems, Methods and Devices for Trusted Transactions".

U.S. Appl. No. 60/234,199, filed Sep. 20, 2000, "Improved Security Based on Subliminal and Supraliminal Channels for Data Objects".

U.S. Appl. No. 09/671,739, filed Sep. 29, 2000, entitled "Method and Device for Monitoring and Analyzing Signals".

Tirkel, A.Z., "A Two-Dimensional Digital Watermark", Scientific Technology, 686, 14, date unknown. (citation revised upon review on Nov. 16, 2010 by RAN.).

PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/33126.
PCT International Search Report in PCT/US00/21189.

Delaigle, J.-F., et al. "Digital Watermarking," Proceedings of the SPIE, vol. 2659, Feb 1, 1996, pp. 99-110.

Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.

Wong, Ping Wah. "A Public Key Watermark for Image Verification and Authentication," IEEE International Conference on Image Processing, vol. 1 Oct. 4-7, 1998, pp. 455-459.

Joseph J.K. O'Ruanaidh and Thierry Pun, "Rotation, Scale and Translation Invariant Digital Image Watermarking", Submitted to Signal Processing Aug. 21, 1997, 19 pages.

OASIS (Dig Out Your Soul), Big Brother Recordings Ltd, Promotional CD image, 2008, 1 page.

Rivest, R. "Chaffing and Winnowing: Confidentiality without Encryption", MIT Lab for Computer Science, http://people.csail.mit.edu/rivest/Chaffing.txt Apr. 24, 1998, 9 pp.

PortalPlayer, PP5002 digital media management system-on-chip, May 1, 2003, 4 pp.

VeriDisc, "The Search for a Rational Solution to Digital Rights Management (DRM)", http://64.244.235.240/news/whitepaper,/docs/veridisc.sub.--white.sub.--paper.pdf, 2001, 15 pp.

Cayre, et al., "Kerckhoff's-Based Embedding Security Classes for WOA Data Hiding", IEEE Transactions on Information Forensics and Security, vol. 3 No. 1, Mar. 2008, 15 pp.

Namgoong, H., "An Integrated Approach to Legacy Data for Multimedia Applications", Proceedings of the 23rd EUROMICRO Conference, vol., Issue 1-4, Sep. 1997, pp. 387-391.

Wayback Machine, dated Aug. 26, 2007, http://web.archive,org/web/20070826151732/http://www.screenplaysmag.com/t-abid/96/articleType/ArticleView/articleId/495/Default.aspx/.

PCT Application No. PCT/US95/08159, filed Jun. 26, 1995, entitled, "Digital Information Commodities Exchange with Virtual Menuing", published as WO/1997/001892; Publication Date: Jan. 16, 1997.

PCT Application No. PCT/US96/10257, filed Jun. 7, 1996, entitled "Steganographic Method and Device"— corresponding to—EPO Application No. 96919405.9, entitled "Steganographic Method and Device", published as WO/1996/042151; Publication Date: Dec. 27, 1996.

PCT Application No. PCT/US97/00651, filed Jan. 16, 1997, entitled, "Method for Stega-Cipher Protection of Computer Code", published as WO/1997/026732; Publication Date: Jul. 24, 1997.

PCT Application No. PCT/US97/00652, filed Jan. 17, 1997, entitled, "Method for an Encrypted Digital Watermark", published as WO/1997/026733; Publication Date: Jul. 27, 1997.

PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.

PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.

PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.

PCT Application No. PCT/US00/18411, filed Jul. 5, 2000, entitled, "Copy Protection of Digital Data Combining Steganographic and Cryptographic Techniques".

PCT Application No. PCT/US00/33126, filed Dec. 7, 2000, entitled "Systems, Methods and Devices for Trusted Transactions", published as WO/2001/043026; Publication Date: Jun. 14, 2001.

EPO Divisional Patent Application No. 07112420.0, entitled "Steganographic Method and Device" corresponding to PCT Application No. PCT/US96/10257, published as WO/1996/042151, Dec. 27, 1996.

U.S. Appl. No. 60/222,023 filed Jul. 31, 2007 entitled "Method and apparatus for recognizing sound and signals in high noise and distortion".

"Techniques for Data Hiding in Audio Files," by Morimoto, 1995.
Howe, Dennis Jul. 13, 1998 http://foldoc..org//steganography.
CSG, Computer Support Group and CSGNetwork.com 1973 http://www.csgnetwork.com/glossarys.html.

QuinStreet Inc. 2010 What is steganography?—A word definition from the Webopedia Computer Dictionary http://www.webopedia.com/terms/steganography.html.

Graham, Robert Aug. 21, 2000 "Hacking Lexicon" http://robertgraham.com/pubs/hacking-dict.html.

Farkex, Inc 2010 "Steganography definition of steganography in the Free Online Encyclopedia" http://encyclopedia2.Thefreedictionary.com/steganography.

Horowitz, et al., The Art of Eletronics. $2^{nd}$ Ed., 1989, pp. 7.

Jimmy eat world ("futures"), Interscope Records, Pre-Release CD image, 2004, 1 page.

Aerosmith ("Just Push Play"), Pre-Release CD image, 2001, 1 page.

Phil Collins(Testify) Atlantic, Pre-Release CD image, 2002, 1 page.

* cited by examiner

OPTIMIZATION METHODS FOR THE INSERTION, PROTECTION, AND DETECTION OF DIGITAL WATERMARKS IN DIGITAL DATA

CROSS-REFERENCE TO RELATED PATENTS AND APPLICATIONS

This application is a continuation of application Ser. No. 11/599,964, filed Nov. 15, 2006, now U.S. Pat. No. 7,647,502, issued Jan. 12, 2010, which is a continuation of application Ser. No. 11/497,822, filed Aug. 2, 2006, now U.S. Pat. No. 7,457,962, issued Nov. 25, 2008, which is a division of application Ser. No. 09/789,711, filed Feb. 22, 2001, now U.S. Pat. No. 7,107,451, issued Sep. 12, 2006, which is a continuation-in-part of application Ser. No. 09/281,279, filed Mar. 30, 1999, now U.S. Pat. No. 6,522,767, issued Feb. 18, 2003, which is a continuation of application Ser. No. 08/677,435, filed Jul. 2, 1996, now U.S. Pat. No. 5,889,868, issued Mar. 30, 1999. The previously identified patents and/or patent applications are hereby incorporated by reference, in their entireties.

This application is related to pending U.S. patent application Ser. No. 08/674,726, filed July 2, 1996, entitled "Exchange Mechanisms for Digital Information Packages with Bandwidth Securitization, Multichannel Digital Watermarks, and Key Management" (issued as U.S. Pat. No. 7,362,775); pending U.S. patent application Ser. No. 08/999,766, filed Jul. 23, 1997, entitled "Steganographic Method and Device" (issued as U.S. Pat. No. 7,568,100); pending U.S. patent application Ser. No. 09/046,627, filed Mar. 24, 1998, entitled "Method for Combining Transfer Function with Predetermined Key Creation" (issued as U.S. Pat. No. 6,598,162); pending U.S. patent application Ser. No. 09/053,628, filed Apr. 2, 1998, entitled "Multiple Transform Utilization and Application for Secure Digital Watermarking" (issued as U.S. Pat. No. 6,205,249); pending U.S. patent application Ser. No. 09/281,279, filed Mar. 30, 1999, entitled "Optimization Methods for the Insertion, Protection, and Detection of Digital Watermarks in Digital Data" (issued as U.S. Pat. No. 6,522,767); pending U.S. Provisional Application No. 60/169,274, filed Dec. 7, 1999, entitled "Systems, Methods And Devices For Trusted Transactions"; pending U.S. patent application Ser. No. 09/456,319, filed Dec. 8, 1999, entitled "Z-Transform Implementation of Digital Watermarks" (issued as U.S. Pat. No. 6,853,726); pending U.S. patent application Ser. No. 09/545,589, filed Apr. 7, 2000, entitled "Method and System for Digital Watermarking" (issued as U.S. Pat. No. 7,007,166); pending U.S. patent application Ser. No. 09/594,719, filed Jun. 16, 2000, entitled "Utilizing Data Reduction in Steganographic and Cryptographic Systems" (which is a continuation-in-part of International Application No. PCT/US00/06522, filed Mar. 14, 2000, which PCT application claimed priority to U.S. Provisional Application No. 60/125,990, filed Mar. 24, 1999) (issued as U.S. Pat. No. 7,123,718); International Application No. PCT/US00/21189, filed Aug. 4,2000(which claims priority to U.S. Patent Application Ser. No. 60/147,134, filed Aug. 4, 1999, and to U.S. Patent Application Ser. No. 60/213,489, filed Jun. 23,2000, both of which are entitled, "A Secure Personal Content Server") (issued as U.S. Pat. No. 7,475,246), U.S. patent application Ser. No. 09/657,181, filed Sep. 7,2000, entitled "Method And Device For Monitoring And Analyzing Signals" (issued as U.S. Pat. No. 7,346,472); U.S. Provisional Patent Application No. 601234,199, filed Sep. 20, 2000, entitled "Improved Security Based on Subliminal and Supraliminal Channels For Data Objects" (issued as U.S. Pat. No. 7,127,615); and U.S. patent application Ser. No. 09/671,739, filed Sep. 29, 2000, entitled "Method And Device For Monitoring And Analyzing Signals," (abandoned); U.S. patent application Ser. No. 09/731,039 entitled "System and Method for Permitting Open Access to Data Objects and For Securing Data Within the Data Objects," filed Dec. 7, 2000 (issued as U.S. Pat. No. 7,177,429); and U.S. patent application Ser. No. 09/731,040, entitled "Systems, Methods and Devices for Trusted Transactions," filed Dec. 7, 2000 (issued as U.S. Pat. No. 7,159,116). The previously identified patents and/or patent applications are hereby incorporated by reference, in their entireties, as if fully stated herein.

In addition, this application hereby incorporates by reference, as if fully stated herein, the disclosures of U.S. Pat. No. 5,613,004 "Steganographic Method and Device"; U.S. Pat. No. 5,745,569 "Method for Stega-Cipher Protection of Computer Code"; U.S. Pat. No. 5,889,868 "Optimization Methods for the Insertion, Protection, and Detection of Digital Watermarks in Digitized Data"; and U.S. Pat. No. 6,078,664, entitled "Z-Transform Implementation of Digital Watermarks."

BACKGROUND OF THE INVENTION

The present invention relates to digital watermarks.

Digital watermarks exist at a convergence point where creators and publishers of digitized multimedia content demand localized, secured identification and authentication of that content. Because existence of piracy is clearly a disincentive to the digital distribution of copyrighted works, establishment of responsibility for copies and derivative copies of such works is invaluable. In considering the various forms of multimedia content, whether "master," stereo, NTSC video, audio tape or compact disc, tolerance of quality degradation will vary with individuals and affect the underlying commercial and aesthetic value of the content. It is desirable to tie copyrights, ownership rights, purchaser information or some combination of these and related data to the content in such a manner that the content must undergo damage, and therefore a reduction in value, with subsequent, unauthorized distribution of the content, whether it be commercial or otherwise.

Legal recognition and attitude shifts, which recognize the importance of digital watermarks as a necessary component of commercially distributed content (audio, video, game, etc.), will further the development of acceptable parameters for the exchange of such content by the various parties engaged in the commercial distribution of digital content. These parties may include artists, engineers, studios, Internet access providers; publishers, agents, on-line service providers, aggregators of content for various forms of delivery, on-line retailers, individuals and parties that participate in the transfer of funds to arbitrate the actual delivery of content to intended parties.

Since the characteristics of digital recordings vary widely, it is a worthwhile goal to provide tools to describe an optimized envelope of parameters for inserting, protecting and detecting digital watermarks in a given digitized sample (audio, video, virtual reality, etc.) stream. The optimization techniques described hereinafter make unauthorized removal of digital watermarks containing these parameters a significantly costly operation in terms of the absolute given projected economic gain from undetected commercial distribution. The optimization techniques, at the least, require significant damage to the content signal, as to make the unauthorized copy commercially worthless, if the digital watermark is removed, absent the use of extremely expensive tools.

Presumably, the commercial value of some works will dictate some level of piracy not detectable in practice and deemed "reasonable" by rights holders given the overall economic return. For example, there will always be fake $100 bills, LEVI'S® jeans, and Gucci® bags, given the sizes of the overall markets and potential economic returns for pirates in these markets—as there also will be unauthorized copies of works of music, operating systems (Windows® 95, etc.), video and future multimedia goods.

However, what differentiates the "digital marketplace" from the physical marketplace is the absence of any scheme that establishes responsibility and trust in the authenticity of goods. For physical products, corporations and governments mark the goods and monitor manufacturing capacity and sales to estimate loss from piracy. There also exist reinforcing mechanisms, including legal, electronic, and informational campaigns to better educate consumers.

SUMMARY OF THE INVENTION

According to one embodiment of the present invention, a system for encoding of digital watermark information in a signal is disclosed. The system includes a window identifier for identifying a sample window in the signal; an interval calculator for determining a quantization interval of the sample window; and a sampler for normalizing the sample window to provide normalized samples. In general, the sample window that is identified will have a maximum and a minimum. The quantization interval is used to quantize normalized window samples. The normalized samples conform to a limited range of values that are proportional to real sample values and comprise a representation of the real sample values with a resolution higher than the real range of values. The normalized values may also be divided by the quantization interval into distinct quantization levels.

According to another embodiment of the present invention, a system for pre-analyzing a digital signal for encoding at least one digital watermark using a digital filter is disclosed. The system includes a processor for identifying an area of the digital signal that will be affected by the digital filter and an encoder for encoding the at least one digital watermark in the digital signal. The encoder encodes the at least one digital watermark so as to avoid the at least one area of the digital signal that will be affected by the digital filter.

According to another embodiment of the present invention, a system for preprocessing a watermark message is disclosed. The system includes a pre-processor for determining an exact length of a watermark message as it will be encoded, and a key generator for generating a watermark key that provides at least one unique bit for each bit comprising the watermark message.

According to still another embodiment of the present invention, a system for encoding a watermark in a digital signal is disclosed. The system includes a generator for generating a plurality of watermark pseudo-random key bits, and an encoder for encoding the watermark in the digital signal using the watermark pseudo-random key bits and characteristics of the digital signal. The generator may be a non-linear generator, a chaotic generator, etc.

According to another embodiment of the present invention, a system for encoding a watermark in a digital signal is disclosed. The system includes a mapper for mapping pseudo-random key and processing state information to effect an encode/decode map using a generator, and an encoder for encoding the watermark in the digital signal using the encode/decode map and characteristics of the digital signal. The generator may be a non-linear generator, a chaotic generator, etc.

According to another embodiment of the present invention, a system for encoding watermarks is disclosed. The system includes an inverter for inverting at least one instance of the watermark bit stream, and an encoder for encoding at least one instance of the watermark using the inverted instance of the watermark bit stream.

According to another embodiment of the present invention, a system for analyzing composite digitized signals for watermarks is disclosed. The system includes a first receiver for receiving a composite signal; a second receiver for receiving an unwatermarked sample signal; an aligner for time aligning the unwatermarked sample signal with the composite signal; an adjuster for gain adjusting the time aligned unwatermarked sample signal to a corresponding segment of the composite signal, determined when the signals are time aligned; an estimator for estimating a pre-composite signal using the composite signal and the gain adjusted unwatermarked sample signal; an estimator for estimating a watermarked sample signal by subtracting the estimated pre-composite signal from the composite signal; and a scanner for scanning the estimated watermarked sample signal for watermarks.

According to another embodiment of the present invention, a method for pre-analyzing a digital signal for encoding a plurality of digital watermarks using a digital filter is disclosed. The method includes the steps of (1) providing a plurality of digital watermarks; (2) determining an encoding level; and encoding each of the plurality of digital watermarks at substantially the same encoding level.

According to another embodiment of the present invention, a method for pre-analyzing a digital signal for encoding digital watermarks using a digital filter is disclosed. The method includes the steps of (1) providing a digital signal; (2) providing a digital filter to be applied to the digital signal; and (3) identifying an area of the digital signal that will be affected by the digital filter based on at least one measurable difference between the digital signal and a counterpart of the digital signal selected from the group consisting of the digital signal as transmitted, the digital signal as stored in a medium, and the digital signal as played backed.

According to another embodiment of the present invention, a method for encoding a watermark in a content signal is disclosed. The method includes the steps of (1) splitting a watermark bit stream; and (2) encoding at least half of the watermark bit stream in the content signal using inverted instances of the watermark bit stream.

According to another embodiment of the present invention, a method for encoding at least one watermark in a content signal is disclosed. The method includes the steps of (1) predetermining a number of bits in the content signal to be encoded, based on at least one of a fixed length key and signal characteristics of the content signal; and (2) encoding the watermark in the predetermined bits.

According to another embodiment of the present invention, a method for encoding at least one watermark in a content signal is disclosed. The method includes the steps of (1) locating at least one noise-like signal feature in the content signal; and (2) encoding the at least one watermark in substantially the same location as the at least one noise-like signal feature.

According to another embodiment of the present invention, a method for encoding at least one digital watermark in a content signal is disclosed. The method includes the steps of (1) measuring a perceived signal-to-error ratio; and (2)

encoding the at least one watermark in a channel bound by a minimum and maximum signal-to-error level for the content signal.

According to another embodiment of the present invention, a method for digital watermark encode/decode comprises the steps of: (1) measuring a perceived signal-to-error ratio; and (2) encoding at least one watermark in a signal feature that is bound by a minimum and maximum signal-to-error level for the digital signal.

According to another embodiment of the present invention, a method for decoding a digital watermark from a content signal is disclosed. The method includes the steps of (1) receiving a suspect digital signal to be analyzed; (2) subjecting the digital signal to a time-based alignment; (3) using the time-based alignment to align amplitude values in the suspect digital signal; and (4) decoding a digital watermark.

According to another embodiment of the present invention, a method for encoding watermarks in a content signal is disclosed. The method includes the steps of (1) identifying a plurality of signal features in the content signal; and (2) inserting watermark data in the signal features. The signal features may be identified from relationships between multiple sample windows in the content signal.

According to another embodiment of the present invention, a method for decoding watermarks in a content signal is disclosed. The method includes the steps of (1) identifying a plurality of signal features in the content signal; and (2) decoding watermark data from the signal features. The signal features may be identified from relationships between multiple sample windows in the content signal.

According to another embodiment of the present invention, a method for pre-analyzing a digital signal for encoding digital watermarks using a digital filter is disclosed. The method includes the steps of (1) identifying at least one of a frequency and a time delimited area of the signal that will be affected by the digital filter; and (2) encoding at least one digital watermark so as to avoid the identified area.

According to another embodiment of the present invention, a method for pre-analyzing a digital signal for encoding digital watermarks using a digital filter is disclosed. The method includes the steps of (1) identifying at least one change to the digital signal that will be affected by the digital filter; and (2) encoding at least one digital watermark so the watermark survives the changes introduced by the digital filter.

According to another embodiment of the present invention, a method for guaranteeing watermark uniqueness is disclosed. The method includes the steps of (1) providing a watermark; and (2) attaching a timestamp to the watermark.

According to another embodiment of the present invention, a method for guaranteeing watermark uniqueness is disclosed. The method includes the steps of (1) providing a watermark; and (2) attaching a user identification dependent hash to the watermark.

According to another embodiment of the present invention, a method for guaranteeing watermark uniqueness is disclosed. The method includes the steps of (1) providing a watermark; and attaching a message digest of watermark data to the watermark.

According to another embodiment of the present invention, a system for digital watermark encode/decode operations comprises: (1) a CODEC database comprising a plurality of CODECs; and (2) a processor which encodes at least one watermark using at least one CODECs from the CODEC database.

According to another embodiment of the present invention, a method for digital watermark encode/decode is disclosed. The method includes the steps of (1) receiving a digital signal stream; (2) using one or more of a plurality of watermarking CODECs; and (3) encoding/decoding at least one of a digital watermark and associating one or more of a plurality of watermarking CODECs with a predetermined key.

According to another embodiment of the present invention, an article of manufacture comprises: a receiver to receive a digital signal; a detector to detect at least two of a plurality of digital watermarks located within the digital signal; and a processor that enables content signal manipulation of the digital signal based on successful detection of at least two of the plurality of digital watermarks. The article may also include a verification module which verifies at least one detected watermark.

According to another embodiment of the present invention, a method for preprocessing a digital data signal to authorize a plurality of unique descendant copies of the digital data signal is disclosed. The method includes the steps of (1) providing a digital data signal; (2) identifying candidate bits of the digital data signal that will be manipulated during embedding; (3) generating a digital watermark message to be embedded based on at least one predetermined criterion; and (4) embedding the digital watermark message in the digital data signal. The candidate bits may be identified through a psychoacoustic or psychovisual model.

According to another embodiment of the present invention, a method for preprocessing a digital data signal to authorize a plurality of unique descendant copies of the digital data signal is disclosed. The method includes the steps of (1) providing a digital data signal; (2) identifying candidate bits of the digital data signal that will be manipulated during scrambling; (3) generating a scrambling key on at least one predetermined criterion; and (4) scrambling the digital data signal with the scrambling key. The candidate bits may be identified through a psychoacoustic or psychovisual model.

According to another embodiment of the present invention, a method for creating a descendant copy of a digital data signal is disclosed. The method includes the steps of (1) obtaining a model for the digital data signal; and (2) generating a watermark for the descendant copy of the digital data signal based on at least one criterion. The criterion may be, for example, a geographical territory, a transaction identification, an individual identification, a use limitation, a signal domain, etc.

DETAILED DESCRIPTION OF PREFERRED EMBODIMENTS

The present invention relates to implementations of digital watermarks that are optimally suited to particular transmission, distribution and storage mediums given the nature of digitally sampled audio, video, and other multimedia works.

The present invention also relates to adapting watermark application parameters to the individual characteristics of a given digital sample stream.

The present invention additionally relates to the implementation of digital watermarks that are feature-based. That is, a system where watermark information is not carried in individual samples, but is carried in the relationships between multiple samples, such as in a waveform shape. For example, in a manner similar to the way a US $100 bill has copy protection features including ink type, paper stock, fiber, angles of artwork that distort in photocopier machines, inserted magnetic strips, and composite art, the present invention envisions natural extensions for digital watermarks that may also separate frequencies (color or audio), channels in 3D while utilizing discreteness in feature-based encoding only known to those with pseudo-random keys (i.e., cryptographic keys) or possibly tools to access such information, which may one day exist on a quantum level.

There are a number of hardware and software approaches in the prior art that attempt to provide protection of multimedia content, including encryption, cryptographic containers, cryptographic envelopes or "cryptolopes," and trusted systems in general. None of these systems places control of copy protection in the hands of the content creator as the content is created, nor provides an economically feasible model for exchanging the content to be exchanged with identification data embedded within the content.

Yet, given the existence of over 100 million personal computers and many more non-copy-protected consumer electronic goods, copy protection seems to belong within the signals. After all, the playing (i.e., using) of the content establishes its commercial value.

Generally, encryption and cryptographic containers serve copyright holders as a means to protect data in transit between a publisher or distributor and the purchaser of the data (i.e., a means of securing the delivery of copyrighted material from one location to another by using variations of public key cryptography or other more centralized cryptosystems).

Cryptolopes are suited specifically for copyrighted text that is time-sensitive, such as newspapers, where intellectual property rights and origin data are made a permanent part of the file. For information on public-key cryptosystems see U.S. Pat. No. 4,200,770 to Hellman et al., U.S. Pat. No. 4,218,582 to Hellman et al., U.S. Pat. No. 4,405,829 to Rivest et al., and U.S. Pat. No. 4,424,414 to Hellman et al., which patents are incorporated herein by reference. Systems are proposed by IBM and Electronic Publishing Resources to accomplish cryptographic container security.

Digitally-sampled copyrighted material, that is binary data on a fundamental level, is a special case because of its long term value coupled with the ease and perfection of copying and transmission by general purpose computing and telecommunications devices. In particular, in digitally-sampled material, there is no loss of quality in copies and no identifiable differences between one copy and any other subsequent copy. For creators of content, distribution costs may be minimized with electronic transmission of copyrighted works. Unfortunately, seeking some form of informational or commercial return via electronic exchange is ill-advised absent the use of digital watermarks to establish responsibility for specific copies and unauthorized copying. Absent digital watermarks, the unlikely instance of a market of trusted parties who report any distribution or exchange of unauthorized copies of the protected work must be relied upon for enforcement. Simply, content creators still cannot independently verify watermarks should they choose to do so.

For a discussion of systems that are oriented around content-based addresses and directories, see U.S. Pat. No. 5,428,606 to Moskowitz, which patent is incorporated herein by reference.

In combining steganographic methods for insertion of information identifying the title, copyright holder, pricing, distribution path, licensed owner of a particular copy, or a myriad of other related information, with pseudo-random keys (which map insertion location of the information) similar to those used in cryptographic applications, randomly placed signals (digital watermarks) can be encoded as random noise in a content signal. Optimal planning of digital watermark insertion can be based on the inversion of optimal digital filters to establish or map areas comprising a given content signal insertion envelope. Taken further, planning operations will vary for different digitized content: audio, video, multimedia, virtual reality, etc. Optimization techniques for processes are described in related patents, including U.S. Pat. No. 5,613,004, entitled "Steganographic Method and Device" and U.S. Pat. No. 5,822,432, entitled "Method for Human Assisted Random Key Generation and Application for Digital Watermark System," which patents are incorporated herein by reference.

Optimization processes must take into consideration the general art of digitization systems where sampling and quantizing are fundamental physical parameters. For instance, discrete time sampling has a natural limit if packets of time are used, estimated at $1 \times 10^{-42}$ second. This provides a natural limit to the sampling operation. Also, since noise is preferable to distortion, quantizing will vary given different storage mediums (magnetic, optical, etc.) or transmission mediums (copper, fiber optic, satellite, etc.) for given digitized samples (audio, video, etc.). Reducing random bit error, quantization error, burst error, and the like is done for the singular goal of preserving quality in a given digitized sample. Theoretical perfect error correction is not efficient, given the requirement of a huge allocation of redundant data to detect and correct errors. In the absence of such overhead, all error correction is still based on data redundancy and requires the following operations: error detection to check data validity, error correction to replace erroneous data, and error concealment to hide large errors or substitute data for insufficient data correction. Even with perfect error correction, the goal of a workable digital watermark system for the protection of copyrights would be to distribute copies that are less than perfect but not perceivably different from the original. Ironically, in the present distribution of multimedia, this is the approach taken by content creators when faced with such distribution mechanisms as the Internet. As an example, for audio clips commercially exchanged on the World Wide Web (WWW), a part of the Internet, 8 bit sampled audio or audio downsampled from 44.1 kHz (CD-quality), to 22 kHz and lower. Digital filters, however, are not ideal because of tradeoffs between attenuation and time-domain response, but provide the engineer or similarly-trained individual with a set of decisions to make about maximizing content quality with minimum data overhead and consideration of the ultimate delivery mechanism for the content (CDs, cable television, satellite, audio tape, stereo amplifier, etc.).

For audio signals, and, more generally, for other frequency-based content, such as video, one method of using digital filters is to include the use of an input filter to prevent frequency aliasing higher than the so-called Nyquist frequencies. The Nyquist theorem specifies that the sampling frequency must be at least twice the highest signal frequency of the sampled information (e.g., for the case of audio, human perception of audio frequencies is in a range between 20 Hz and 20 kHz, such signals should be sampled at a frequency of at least 40 KHz). Without an input filter, aliases can still occur leaving an aliased signal in the original bandwidth that cannot be removed.

Even with anti-aliasing filters, quantization error can still cause low level aliasing which may be removed with a dither technique. Dither is a method of adding random noise to the signal, and is used to de-correlate quantization error from the signal while reducing the audibility of the remaining noise. Distortion may be removed, but at the cost of adding more noise to the filtered output signal. An important effect is the subsequent randomization of the quantization error while still leaving an envelope of an unremovable signaling band of noise. Thus, dither is done at low signal levels, affecting only the least significant bits of the samples. Conversely, digital watermarks, which may take the form of essentially randomly-mapped noise, are intended to be inserted into samples of digitized content in a manner such as to maximize encoding levels while minimizing any perceivable artifacts that would indicate their presence or allow for removal by filters, and without destroying the content signal. Further, digital watermarks should be inserted with processes that necessitate random searching in the content signal for watermarks if an attacker lacks the keys. Attempts to over-encode noise into known watermarked signal locations to eliminate the information signal can be made difficult or impossible without damning the content signal by relying on temporal encoding and randomization in the generation of keys during digital watermark insertion. As a result, although the watermark occupies only a small percentage of the signal, an attacker is forced to over-encode the entire signal at the highest encoding level, which creates audible artifacts.

The present invention relates to methods for obtaining more optimal models to design watermark systems that are tamper-resistant given the number and breadth of existent digitized sample options with differing frequency and time components (audio, video, pictures, multimedia, virtual reality, etc.).

To accomplish these goals, the present invention maintains the highest quality of a given content signal as it was mastered, with its watermarks suitably hidden, taking into account usage of digital filters and error correction presently concerned solely with the quality of content signals.

Additionally, where a watermark location is determined in a random or pseudo-random operation dependent on the creation of a pseudo-random key, as described in U.S. Pat. No. 5,613,004, and unlike other forms of manipulating digitized sample streams to improve quality or encode known frequency ranges, an engineer seeking to provide high levels of protection of copyrights, ownership, etc. is concerned with the size of a given key, the size of the watermark message and the most suitable area and method of insertion. Robustness is improved through highly redundant error correction codes and interleaving, including codes known generally as q-ary Bose-Chaudhuri-Hocquenghem (BCH) codes, a subset of Hamming coding operations, and codes combining error correction and interleaving, such as the Cross-interleave Reed-Solomon Code. Using such codes to store watermark information in the signal increases the number of changes required to obliterate a given watermark. Preprocessing the watermark by considering error correction and the introduction of random data to make watermark discovery more difficult, prior to watermarking, will help determine sufficient key size. More generally, absolute key size can be determined through preprocessing the message and the actual digital watermark (a file including information regarding the copyright owner, publisher, or some other party in the chain of exchange of the content) to compute the absolute encoded bit stream and limiting or adjusting the key size parameter to optimize the usage of key bits. The number of bits in the primary key should match or exceed the number of bits in the watermark message, to prevent redundant usage of key bits. Optimally, the number of bits in the primary key should exactly match the watermark size, since any extra bits are wasted computation.

Insertion of informational signals into content signals have been contemplated. More detailed discussions are included in related patents entitled "Steganographic Method and Device" and "Method for Human Assisted Random Key Generation and Application for Digital Watermark System." The following discussion illustrates some previously disclosed systems and their weaknesses.

Typically, previously disclosed systems lack emphasis or implementation of any pseudo-random operations to determine the insertion location, or map, of information signals relating to the watermarks. Instead, previous implementations provide "copy protect" flags in obvious, apparent and easily removable locations. Further, previous implementations do not emphasize the alteration of the content signal upon removal of the copy protection.

Standards for digital audio tape (DAT) prescribe insertion of data, such as ISRC (Industry Standard Recording Codes) codes, title, and time in sub-code according to the Serial Copy Management System (SCMS) to prevent multiple copying of the content. One time copying is permitted, however, and systems with AES3 connectors, which essentially override copy protection in the sub-code as implemented by SCMS, actually have no copy limitations. The present invention provides improvement over this implementation with regard to the ability of unscrupulous users to load digital data into unprotected systems, such as general computing devices, that may store the audio clip in a generalized file format to be distributed over an on-line system for further duplication. The security of SCMS (Serial Copy Management System) can only exist as far as the support of similarly oriented hardware and the lack of attempts by those skilled in the art to simply remove the subcode data in question.

Previous methods seek to protect content, but the shortcomings are apparent. U.S. Pat. No. 5,319,735 to Preuss et al. discusses a spread spectrum method that would allow for over-encoding of the described, thus known, frequency range, and is severely limited in the amount of data that can be encoded—4.3 8-bit symbols per second. However, with the Preuss et al. method, randomization attacks will not result in audible artifacts in the carrier signal, or degradation of the content as the information signal is in the subaudible range. It is important to note the difference in application between spread spectrum in military field use for protection of real-time radio signals, and encoding information into static audio files. In the protection of real-time communications, spread spectrum has anti jam features, since information is sent over several channels at once. Therefore, in order to jam the signal, one has to jam all channels, including their own. In a static audio file, however, an attacker has practically unlimited time and processing power to randomize each sub-channel in the signaling band without penalty to themselves, so the anti jam advantages of spread spectrum do not extend to this domain.

In a completely different implementation, U.S. Pat. No. 5,379,345 to Greenberg seeks enforcement of broadcast contracts using a spread spectrum modulator to insert signals that are then confirmed by a spread spectrum-capable receiver to establish the timing and length that a given, marked advertisement is played. This information is measured against a specific master of the underlying broadcast material. The Greenberg patent does not ensure that real-time downloads of copyrighted content can be marked with identification information unless all download access points (PCs, modems, etc.), and upload points for that matter, have spread spectrum devices for monitoring.

Other methods include techniques similar to those disclosed in related patents and patent applications cited above, but lack the pseudo-random dimension of those patent applications for securing the location of the signals inserted into the content. One implementation conducted by Michael Gerzon and Peter Craven, and described by Ken Pohlmann in the Third edition of Principles of Digital Audio, illustrates a technology called "buried data technique," but does not address the importance of randomness in establishing the insertion locations of the informational signals in a given content signal, as no pseudo-random methods are used as a basis for insertion. The overriding concern of the "buried data techniques" appears to be to provide for a "known channel" to be inserted in such a manner as to leave little or no perceivable artifacts in the content signal while prescribing the exact location of the information (i.e., replacing the least significant bits (LSB) in a given information signal). In Gerzon and Craven's example, a 20-bit signal gives way to 4-bits of LSBs for adding about 27 dB of noise to the music. Per channel data insertion reached 176.4 kilobits per second per channel, or 352.8 kbps with stereo channels. Similarly attempted data insertion by the present inventors using random data insertion yielded similar rates. The described techniques may be invaluable to manufacturers seeking to support improvements in audio, video and multimedia quality improvements. These include multiple audio channel support, surround sound, compressed information on dynamic range, or any combination of these and similar data to improve quality. Unfortunately, this does little or nothing to protect the interests of copyright holders from unscrupulous pirates, as they attempt to create unmarked, perfect copies of copyrighted works.

The present invention also relates to the "Steganographic Method and Device" patent and the "Method for Human-Assisted Random Key Generation and Application for Digital Watermark System" patent, as well as U.S. Pat. No. 5,745,569 entitled "Method for Stega-Cipher Protection of Computer Code" as mentioned above, specifically addressing the weakness of inserting informational signals or digital watermarks into known locations or known frequency ranges, which are sub-audible. The present invention seeks to improve on the methods disclosed in these patent applications and other methods by describing specific optimization techniques at the disposal of those skilled in the art. These techniques provide an a la carte method for rethinking error correction, interleaving, digital and analog filters, noise shaping, nonlinear random location mapping in digitized samples, hashing, or making unique individual watermarks, localized noise signal mimic encoding to defeat noise filtering over the entire sample stream, super audible spread spectrum techniques, watermark inversion, preanalyzing watermark key noise signatures, and derivative analysis of suspect samples against original masters to evaluate the existence of watermarks with statistical techniques.

The goal of a digital watermark system is to insert a given information signal or signals in such a manner as to leave few or no artifacts in the underlying content signal, while maximizing its encoding level and location sensitivity in the signal to force damage to the content signal when removal is attempted. The present invention establishes methods for estimating and utilizing parameters, given principles of the digitization of multimedia content (audio, video, virtual reality, etc.), to create an optimized "envelope" for insertion of watermarks, and thus establish secured responsibility for digitally sampled content. The pseudo-random key that is generated is the only map to access the information signal while not compromising the quality of the content. A digital watermark naturally resists attempts at removal because it exists as purely random or pseudo-random noise in a given digitized sample. At the same time, inversion techniques and mimicking operations, as well as encoding signal features instead of given samples, can make the removal of each and every unique encoded watermark in a given content signal economically infeasible (given the potential commercial returns of the life of a given copyright) or impossible without significantly degrading the quality of the underlying, "protected" signal. Lacking this aesthetic quality, the marketability or commercial value of the copy is correspondingly reduced.

The present invention preserves quality of underlying content signals, while using methods for quantifying this quality to identify and highlight advantageous locations for the insertion of digital watermarks.

The present invention integrates the watermark, an information signal, as closely as possible to the content signal, at a maximal level, to force degradation of the content signal when attempts are made to remove the watermarks.

General methods for watermarking digitized content, as well as computer code, are described in related patents entitled "Steganographic Method and Device" and entitled "Method for Stega-Cipher Protection of Computer Code." Recognizing the importance of perceptual encoding of watermarks by the authors and engineers who actually create content is addressed in patent "Method for Human Assisted Random Key Generation and Application for Digital Watermark System."

The present invention describes methods of random noise creation given the necessary consequence of improving signal quality with digitization techniques. Additionally, methods are described for optimizing projections of data redundancy and overhead in error correction methods to better define and generate parameters by which a watermarking system can successfully create random keys and watermark messages that subsequently cannot be located and erased without possession of the key that acts as the map for finding each encoded watermark. This description will provide the backdrop for establishing truly optimized watermark insertion including: use of nonlinear (chaotic) generators; error correction and data redundancy analysis to establish a system for optimizing key and watermark message length; and more general issues regarding desired quality relating to the importance of subjecting watermarked content to different models when the content may be distributed or sold in a number of prerecorded media formats or transmitted via different electronic transmission systems; this includes the use of perceptual coding; particularized methods such as noise shaping; evaluating watermark noise signatures for predictability; localized noise function mimic encoding; encoding signal features; randomizing time to sample encoding of watermarks; and, finally, a statistical method for analyzing composite watermarked content against a master sample content to allow watermark recovery. All of these features can be incorporated into specialized digital signal processing microprocessors to apply watermarks to nongeneralized computing devices, such as set-top boxes, video recorders that require time stamping or authentication, digital versatile disc (DVD) machines and a multitude of other mechanisms that play or record copyrighted content.

As discussed above, the Nyquist Theorem proves that bandlimited signals can be sampled, stored, processed, transmitted, reconstructed, desampled or processed as discrete values. In order for the theorem to hold true, the sampling must be done at a frequency that is at least twice the frequency of the highest signal frequency to be captured and reproduced. Aliasing will occur as a form of signal fold over, if the signal contains components above the Nyquist frequency. To establish the highest possible quality in a digital signal, aliasing is prevented by low-pass filtering the input signal to a given digitization system by a low-pass or anti-aliasing filter. Any residue aliasing which may result in signal distortion, relates to another area of signal quality control, namely, quantization error removal.

Quantization is required in a digitization system. Because of the continuous nature of an analog signal (amplitude vs. time), a quantized sample of the signal is an imperfect estimate of the signal sample used to encode it as a series of discrete integers. These numbers are merely estimates of the true value of the signal amplitude. The difference between the true analog value at a discrete time and the quantization value is the quantization error. The more bits allowed per sample, the greater the accuracy of estimation; however, errors still always will occur. It is the recurrent nature of quantization errors that provides an analogy with the location of digital watermarks.

Thus, methods for removal of quantization errors have relevance in methods for determining the most secure locations for placement of watermarks to prevent the removal of such watermarks.

The highest fidelity in digital reproduction of a signal occurs at points where the analog signal converges with a given quantization interval. Where there is no such convergence, in varying degrees, the quantization error will be represented by the following range:

+Q/2 and −Q/2, where Q is the quantization interval. Indeed, describing maximization of the quantization error and its ratio with the maximum signal amplitude, as measured, will yield a signal-to-error ratio (S/E) which is closely related to the analog signal-to-noise ratio (S/N). To establish more precise boundaries for determining the S/E, with root mean square (rms) quantization error $E_{rms}$, and assuming a uniform probability density function 1/Q (amplitude), the following describes the error:

$$E_{rms} = Q/(12)^{1/2}$$

Signal to quantization error is expressed as:

$$S/E = [S_{rms}/E_{rms}]^2 = 3/2 (2^{2n})$$

Finally, in decibels (dB) and comparing 16-bit and 15-bit quantization:

$$S/E(\text{db}) = 10\log[(3/2) \cdot sup \cdot 1/2(2 \cdot sup \cdot n)] \cdot sup \cdot 2$$
$$= 10\log(3/2) + 2 \cdot sup \cdot n\log 2$$
$$(or`` = 20\log[(3/2) \cdot sup \cdot 1/2(2 \cdot sup \cdot n)]'')$$
$$= 6.02n + 1.76$$

This explains the S/E ratio of 98 dB for 16-bit and 92 dB for 15-bit quantization. The 1.76 factor is established statistically as a result of peak-to-rms ratio of a sinusoidal waveform, but the factor will differ if the signal waveform differs. In complex audio signals, any distortion will exist as white noise across the audible range. Low amplitude signals may alternatively suffer from distortion.

Quantization distortion is directly related with the original signal and is thus contained in the output signal. This being the case, implementation of so-called quality control of the signal may use dither. As discussed above, dither is a method of adding random noise to the signal to de-correlate quantization error from the signal while reducing the audibility of the remaining noise. Distortion may be removed at the cost of adding more noise to the filtered output signal. An important effect is the subsequent randomization of the quantization error while still leaving an envelope of an unremovable signaling band of noise. Dither, done at low signal levels, typically affects only the least significant bits of the samples.

Use of linear and nonlinear quantization can affect the output signal, and this trade-off must be considered for a system of watermarks designed to determine acceptable quantization distortion to contain the digital watermark. For audio systems, block linear quantization implementations may be chosen. However, block floating point and floating point systems, non-uniform companding, adaptive delta modulation, adaptive differential pulse-code modulation, and perceptual coding schemes (which are oriented around the design of filters that closely match the actual perception of humans) appear to provide alternative method implementations that would cause higher perceptible noise artifacts if filtering for watermarks was undertaken by pirates. The choice of method is related to the information overhead desired.

According to one aspect of the present invention, the envelope described in the quantization equations above is suitable for preanalysis of a digitized sample to evaluate optimal locations for watermarks. The present example is for audio, but corresponding applications for digitization of video may be implemented using the quantization of color and luminance.

The matter of dither complicates preanalysis of a sample evaluated for digital watermarks. Therefore, the present invention also defines the optimal envelope more closely given three types of dither (this example is for audio, others exist for video): triangular probability density function (pdf), Gaussian pdf, and rectangular pdf. Again, the purpose is to establish better boundaries for the random or pseudo-random insertion of a watermark in a region of a content signal that would represent an area for hiding watermarks in a manner most likely to cause damage to the content signal if unauthorized searches or removal are undertaken. Dither makes removal of quantization error more economical through lower data overhead in a system by shifting the signal to decorrelate errors from the underlying signal. When dither is used, the dither noise and signal are quantized together to randomize the error. Dither which is subtractive requires removing the dither signal after requantization and creates total error statistical independence. Subtractive dither also provides further parameters for digital watermark insertion given the ultimate removal of the dither signal before finalizing the production of the content signal. With nonsubtractive dither, the dither signal is permanently left in the content signal. Errors would not be independent between samples. For this reason, further analysis with the three types of dither should reveal an acceptable dither signal without materially affecting the signal quality.

Some proposed systems for implementing copyright protection into digitally-sampled content predicate the natural occurrence of artifacts that cannot be removed. Methods for creating a digital signature in the minimized error that is evident, as demonstrated by explanations of dither, point out another significant improvement over the art in the system described in the present invention and its antecedents. Every attempt is made to raise the error level of error from LSBs to a level at which erasure necessarily leads to the degradation of the "protected" content signal. Furthermore, with such a system, pirates are forced to make guesses, and then changes, at a high enough encoding level over a maximum amount of the content signal so as to cause signal degradation, because guessing naturally introduces error. Thus, dither affects the present invention's envelope by establishing a minimum encoding level. Any encoding done below the dither level might be erased by the dither.

One embodiment of the present invention may be viewed as the provision of a random-super-level non-subtractive dither which contains information (the digital watermark).

To facilitate understanding how this does not cause audible artifacts, consider the meaning of such encoding in terms of the S/E ratio. In a normal 16-bit signal, there is a 98 dB S/E according to the equation S/E=6.02n+1.76. Consider that the encoding of watermark information looks like any other error, except it moves beyond the quantization level, out of the LSBs. If the error is of a magnitude expressed in bits, for example, 8 bits, then at that moment, the signal effectively drops to 8 bits (16-8). This corresponds to a momentary drop in S/E, referred to herein as the momentary S/E. Yet, these errors are relatively few and far between and therefore, since the signal is otherwise comprised of higher-bit samples, a "Perceived S/E" may be derived which is simply the weighted average of the samples using the "Pure S/E" (the samples without watermark information) and those with the Momentary S/E. As a direct consequence, it may be observed that as the watermark map becomes more sparse, the number of errors introduced in a given range is reduced, and the higher the perceived S/E. It also helps that the error is random, and so over time, appears as white noise, which is relatively unobtrusive. In general, it is observed that as long as introduced errors leave resulting samples within an envelope in the sample window described by minimum and maximum values, before error introduction, and the map is sufficiently sparse, the effects are not perceived.

In addition, it is possible to obtain an even higher Perceived S/E by allowing the range of introduced errors to vary between a minimum and maximum amount. This makes the weighted average S/E higher by reducing the average introduced error level. Yet, someone trying to erase a watermark, assuming they knew the maximum level, would have to erase at that level throughout the data, since they would not know how the introduced level varies randomly, and would want to erase all watermarks.

A watermarking cipher could perform this operation and may also introduce the further step of local dither (or other noise) significantly above the quantization amplitude on a window by window basis, randomly, to restrict total correlation between the watermark signal and the probability that it remains independent between samples, similar to the use of subtractive dither implementations that are mostly concerned with the ultimate removal of the dither signal with requantization. This ability could be used to accomplish signal doping, which adds a degree of random errors that do not contain watermark information so as to prevent differential analysis of multiple watermarked copies. Alternatively, it could be used to mimic a specific noise function in a segment of the signal in order to defeat attempts to filter a particular type of noise over the entire signal. By varying this function between watermarks, it may help ensure that any particular filter is of little use over the whole signal. By applying several filters in series, it seems intuitive that the net results would be significantly different from the original signal.

The discussion may be more appropriately introduced with perceptual coding techniques, but a watermarking system could also defeat some detection and correction with dither by inserting watermarks into signal features, instead of signal samples. This would be equivalent to looking for signal characteristics, independent of the overall sample as it exists as a composite of a number of signals. Basically, instead of encoding on a bit per sample basis, one might spread bits over several samples. The point of doing this is that filtering and convolution operations, like "flanging," which definitely change individual samples on a large scale, might leave intact enough of a recognizable overall signal structure (the relationship between multiple samples) to preserve the watermark information. This may be done by measuring, generalizing, and altering features determined by the relationships between samples or frequency bands. Because quantization is strictly an art of approximation, signal-to-error ratios, and thus the dynamic range of a given system are determined.

The choice of eliminating quantization distortion at the expense of leaving artifacts (not perceptible) is a permanent trade-off evident in all digitization systems which are necessarily based on approximation (the design goal of the present invention in preanalyzing a signal to mask the digital watermarks make imperceptibility possible). The high fidelity of duplication and thus subsequent ability to digitally or electronically transmit the finished content (signal) is favored by consumers and artists alike. Moreover, where there continues to be a question of approximating in quantization—digital watermark systems will have a natural partner in seeking optimized envelopes in the multitude and variety of created digitized content.

Another aspect of optimizing the insertion of digital watermarks regards error correction. Highly redundant error codes and interleaving might create a buffer against burst errors introduced into digital watermarks through randomization attacks. A detailed description follows from the nature of a digitization system—binary data can be corrected or concealed when errors exist. Random bit errors and burst errors differ in their occurrence: Random bit errors are error bits occurring in a random manner, whereas burst errors may exist over large sequences of the binary data comprising a digitized signal. Outside the scope of the present invention are errors caused by physical objects, such as dust and fingerprints, that contribute to the creation of dropouts are different from the errors addressed herein.

Measuring error with bit-error ratio (BER), block error ratio (BLER) and burst-error length (BERL), however, provides the basis of error correction. Redundancy of data is a focus of the present invention. This data necessarily relies on existing data, the underlying content. To efficiently describe optimal parameters for generating a cryptographic key and the digital watermark message discussion of error correction and error concealment techniques is important.

Forms of error detection include one-bit parity, relying on the mathematical ability to cast out numbers, for binary systems including digitization systems, such as 2. Remainders given odd or even results (parity) that are probabilistically determined to be errors in the data. For more appropriate error detection algorithms, such as Cyclic Redundancy Check Code (CRCC), which are suited for the detection of commonly occurring burst error. Pohlmann (Principles of Digital Audio) notes the high accuracy of CRCC (99.99%) and the truth of the following statements given a k-bit data word with m bits of CRCC, a code word of n bits is formed (m=n-k):

burst errors less than or equal to m bits are always predictable.

the detection probability of burst errors of m+1 bits= $1-2^{-m}$.

the detection probability of burst errors longer than m+1 bits=$1-2^{-m}$ $^{random\ errors\ up\ to}$ 3 consecutive bits long can be detected.

The medium of content delivery, however, provides the ultimate floor for CRCC design and the remainder of the error correction system.

Error correction techniques can be broken into three categories: methods for algebraic block codes, probabilistic methods for convolutional codes, and cross-interleave code where block codes are used in a convolution structure. As previously discussed, the general class of codes that assist in pointing out the location of error are known generally as Hamming codes, versus CRCC which is a linear block code.

What is important for establishing parameters for determining optimized error coding in systems such as digital audio are more specifically known as Reed-Solomon Codes which are effective methods for correcting burst errors. Certain embodiments of the present invention presuppose the necessity of highly redundant error codes and interleaving, such as that done in Cross Interleave Reed-Solomon Code, to counter burst errors typically resulting from randomization attacks. More generally, certain embodiments of the present invention include the use of Hamming Codes of (n, n) to provide n-1 bit error detection and n-2 bit error correction. Further, a Hamming distance of n (or greater than n) is significant because of the nature of randomization attacks. Such an attack seeks to randomize the bits of the watermark message. A bit can be either 0 or 1, so any random change has a 50% chance of actually changing a bit from what it was (50% is indicative of perfect randomness). Therefore, one must assume that a good attack will change approximately half the bits (50%). A Hamming distance of n or greater, affords redundancy on a close par with such randomization. In other words, even if half the bits are changed, it would still be possible to recover the message.

Because interleaving and parity make data robust for error avoidance, certain embodiments of the present invention seek to perform time interleaving to randomly boost momentary S/E ratio and help prevent removing keys and watermarks that may be subsequently determined not to be "errors."

Given a particular digital content signal, parity, interleaving, delay, and cross-interleaving, used for error correction, should be taken into account when preprocessing information to compute absolute size requirements of the encoded bit stream and limiting or adjusting key size parameters to optimize and perhaps further randomize usage of key bits. In addition, these techniques minimize the impact of errors and are thus valuable in creating robust watermarks.

Uncorrected errors can be concealed in digital systems. Concealment offers a different dynamic to establish insertion parameters for the present invention. Error concealment techniques exist because it is generally more economical to hide some errors instead of requiring overly expensive encoders and decoders and huge information overheads in digitization systems. Muting, interpolation, and methods for signal restoration (removal of noise) relate to methods suggested by the present invention to invert some percentage or number of watermarks so as to ensure that at least some or as many as half of the watermarks must still remain in the content signal to effectively eliminate the other half. To invert a watermark relative to another watermark is to inverse the mathematical or logical relationships between the two watermarks (for example, without limitation, by bit flipping, by inverting the phase relationships, or by using an inverse filter relationship). Given that a recording contains noise, whether due to watermarks or not, a restoration which "removes" such noise is likely to result in the changing of some bit of the watermark message. Therefore, by inverting every other watermark, it is possible to insure that the very act of such corrections inverts enough watermark bits to create an inverse watermark. This inversion presupposes that the optimized watermark insertion is not truly optimal, given the will of a determined pirate to remove watermarks from particularly valuable content.

Ultimately, the inability to resell or openly trade unwatermarked content will help enforce, as well as dictate, the necessity of watermarked content for legal transactions.

The mechanisms discussed above reach physical limits as the intent of signal filtering and error correction are ultimately determined to be effective by humans—decidedly analog creatures. All output devices are thus also analog for playback.

The present invention allows for a preprocessed and preanalyzed signal stream and watermark data to be computed to describe an optimized envelope for the insertion of digital watermarks and creation of a pseudorandom key, for a given digitized sample stream. Randomizing the time variable in evaluating discrete sample frames of the content signal to introduce another aspect of randomization could further the successful insertion of a watermark. More importantly, aspects of perceptual coding are suitable for methods of digital watermarks or super-audible spread spectrum techniques that improve on the art described by the Preuss et al. patent described above.

The basis for a perceptual coding system, for audio, is psychoacoustics—the analysis of what the human ear is able to perceive. Similar analysis is conducted for video systems, and some may argue abused, with such approaches as "subliminal seduction" in advertising campaigns. Using the human for design goals is vastly different than describing mathematical or theoretical parameters for watermarks. On some level of digital watermark technology, the two approaches may actually complement each other and provide for a truly optimized model.

The following example applies to audio applications. However, this example and other examples provided herein are relevant to video systems as well as audio systems. Where a human ear can discern between energy inside and outside the "critical band," (described by Harvey Fletcher) masking can be achieved. This is particularly important as quantization noise can be made imperceptible with perceptual coders given the maintenance of a sampling frequency, and decreased word length (data) based on signaling conditions. This contrasts with the necessary decrease of 6 dB/bit with decreases in the sampling frequency as described above in the explanation of the Nyquist Theorem. Indeed, data quantity can be reduced by 75%. This is an extremely important variable to feed into the preprocessor that evaluates the signal in advance of "imprinting" the digital watermark.

In multichannel systems, such as MPEG-1, AC-3 and other compression schemes, the data requirement (bits) is proportional to the square root of the number of channels. What is accomplished is masking that is nonexistent perceptually, only acoustically. The phrase "nonexistent perceptually" means merely that the masking is not perceived as being present.

Taken to another level for digital watermarking, which is necessary for content that may be compressed and decompressed, forward adaptive allocation of bits and backward adaptive allocation provide for encoding signals into content signals in such a manner that information can be conveyed in the transmission of a given content signal that is subsequently decoded to convey the relatively same audible signal to a signal that carries all of its bits—e.g., no perceptual differences between two signals that differ in bit size. This coding technique must also be preanalyzed to determine the most likely sample bits, or signal components, that will exist in the smaller sized signal. This is also clearly a means to remove digital watermarks placed into LSBs, especially when they do not contribute significant perceptible value to the analyzed signal. Further methods for data reduction coding are similarly important for preanalyzing a given content signal prior to watermarking. Frequency domain coders, such as sub-band and transform bands, can achieve data reduction of ratios between 4:1 and 12:1. The coders adaptively quantize samples in each sub-band based on the masking threshold in that sub-band (See Pohlmann, Principles of Digital Audio). Transform coders, however, convert time domain samples into the frequency domain for accomplishing lossless compression. Hybrid coders combine both sub-band and transform coding, again with the ultimate goal of reducing the overall amount of data in a given content signal without loss of perceptible quality.

With digital watermarks, descriptive analysis of an information signal is important to preanalyze a given watermark's noise signature. Analysis of this signature versus the preanalysis of the target content signal for optimized insertion location and key/message length, are potentially important components to the overall implementation of a secure watermark. It is important that the noise signature of a digital watermark be unpredictable without the pseudo-random key used to encode it. Noise shaping, thus, has important applications in the implementation of the present invention. In fact, adaptive dither signals can be designed to correlate with a signal so as to mask the additional noise—in this case a digital watermark. This relates to the above discussion of buried data techniques and becomes independently important for digital watermark systems. Each instance of a watermark, where many are added to a given content signal given the size of the content and the size of the watermark message, can be "noise shaped" and the binary description of the watermark signature may be made unique by "hashing" the data that comprises the watermark. Generally, hashing the watermark prior to insertion is recommended to establish differences between the data in each and every watermark "file."

Additionally, the present invention provides a framework in which to analyze a composite content signal that is suspected to contain a watermarked sample of a copyrighted work, against an unwatermarked original master of the same sample to determine if the composite content actually contains a copy of a previously watermarked content signal. Such an analysis may be accomplished in the following scenario:

Assume the composite signal contains a watermark from the sample.

Assume the provision of the suspect composite signal $C_w(t)$ (w subscript denotes a possible watermark) and the unwatermarked original sample $S_{uw}(t)$. These are the only two recordings the analyzer is likely to have access to.

Now, it is necessary to recover a watermarked sample $S_w(t)$.

The methods of digital signal processing allow for the computation of an optimal estimate of a signal. The signal to be estimated is the composite minus the watermarked sample, or $C''_w(t)=C_w(t)-S_w-(t)$. The analyzer, however, cannot determine a value of $S_w(t)$, since it does not know which of the many possible $S_w(t)$ signals was used in the composite. However, a close estimate may be obtained by using $S_{uw}(t)$, since watermarking makes relatively minor changes to a signal.

So, $C''_v(t)$ (an estimate of $C''_v(t)$ given $C''_w(t)$ and $S'_w(t)$) may be obtained. Once $C''_w(t)$ is calculated, it is simply subtracted from $C_w(t)$. This yields $S'_w(t)$ $C_w(t)-C''_w(t)$. If the watermark is robust enough, and the estimate good enough, then $S'_w(t)$, which is approximately equal to $S_w(t)$, can be processed to extract the watermark. It is simply a matter of attempting watermark decoding against a set of likely encoding key candidates.

Note that although a watermark is initially suspected to be present in the composite, and the process as if it is, the specifics of the watermark are not known, and a watermark is never introduced into the calculations, so a watermark is extracted, it is valid, since it was not introduced by the signal processing operations.

The usefulness of this type of operation is demonstrated in the following scenario:

People are interested in simply proving that their copyrighted sample was dubbed into another recording, not the specifics of ownership of the sample used in the dubbing. So, this implies that only a single, or limited number of watermark keys would be used to mark samples, and hence, the decode key candidates are limited, since the same key would be used to encode simple copyright information which never varies from copy to copy.

There are some problems to solve to accomplish this sort of processing. The sample in question is generally of shorter duration than the composite, and its amplitude may be different from the original. Analysis techniques could use a combination of human-assisted alignment in the time domain, where graphical frequency analysis can indicate the temporal location of a signal which closely matches that of the original sample. In addition, automatic time warping algorithms which time align separate signals, on the assumption they are similar could also be used to solve temporal problems. Finally, once temporal alignment is accomplished, automatic amplitude adjustment could be performed on the original sample to provide an optimal match between the composite section containing the sample and the original sample.

It may be desirable to dynamically vary the encoding/decoding algorithm during the course of encoding/decoding a signal stream with a given watermark. There are two reasons for dynamically varying the encoding/decoding algorithm.

The first reason for dynamically varying the encoding/decoding algorithm is that the characteristics of the signal stream may change between one locality in the stream and another locality in the stream in a way that significantly changes the effects that a given encoding algorithm may have on the perception of that section of the stream on playback. In other words, one may want the encoding algorithm, and by implication, the decoding algorithm, to adapt to changes in the signal stream characteristics that cause relative changes in the effects of the encoding algorithm, so that the encoding process as a whole causes fewer artifacts, while maintaining a certain level of security or encoding a given amount of information.

The second reason for dynamically varying the encoding/decoding algorithm is simply to make more difficult attempts at decoding watermarks without keys. It is obviously a more difficult job to attempt such attacks if the encoding algorithm has been varied. This would require the attacker to guess the correct order in which to use various decoding algorithms.

In addition, other reasons for varying the encoding/decoding algorithms may arise in the future.

Two methods for varying of the encoding/decoding algorithms according to embodiments of the present invention are described herein. The first method corresponded to adaptation to changing signal characteristics. This method requires a continuous analysis of the sample windows comprising the signal stream as passed to the framework. Based on these characteristics, which are mathematically well-defined functions of the sample stream (such as RMS energy, RMS/peak ratio, RMS difference between samples—which could reflect a measure of distortion), a new CODEC (encoder/decoder) module, from among a list of pre-defined CODECs, and the algorithms implemented in them, can be applied to the window in question. For the purpose of this discussion, windows are assumed to be equivalent to frames. And, in a frame-based system, this is a straightforward application of the architecture to provide automated variance of algorithms to encode and decode a single watermark. The signal features (or signal characteristics) can also be identified from relationships between multiple sample windows in the digital content signal. For example, an implementation using a sample window size of 15 seconds can be compared to an implementation using a sample window size of 45 seconds. The comparison will reveal differences in robustness of the encoding and decoding operations—which differences will be useful in identifying signal features that are desirable to target.

The second method for varying of the encoding/decoding algorithms corresponds to increased security. This method is easier, since it does not require the relatively computationally-expensive process of further analyzing the samples in a frame passed to the Framework. In this method, the Framework selects a new CODEC, from among a list of predefined CODECs, to which to pass the sample frame as a function of the pseudo-random key employed to encode/decode the watermark. Again, this is a straightforward application of framework architecture which provides automated variance of algorithms to encode and decode a single watermark versus limitations evident in the analysis of a single random noise signal inserted over the entire content signal as proposed by Digimarc, NEC, Thorn EMI and IBM under the general guise of spread spectrum, embedded signaling schemes.

It is important to note that the modular framework architecture, in which various modules including CODECs are linked to keys, provides a basic method by which the user can manually accomplish such algorithmic variations for independent watermarks. The main difference detailed above is that an automated method to accomplish this can be used within single watermarks.

Automated analysis of composited copyrighted material offers obvious advantages over subjective "human listening" and "human viewing" methods currently used in copyright infringement cases pursued in the courts.

In addition to the embodiments discussed above, in the same manner that the signal to be watermarked, or scrambled, may be separated in time (from the beginning to the end of the signal) into streams, as disclosed in the copending U.S. patent application Ser. No. 09/594,719, entitled "Utilizing Data Reduction in Steganographic and Cryptographic Systems," (issued as U.S. Pat. No. 7,123,718) additional processing may occur prior to the actual embedding of the watermark ("preprocessing") as well as after each instance of watermark embedding ("postprocessing"). The pre- and post-processing may be used to optimize the actual embedding process.

In cases where the intent is to watermark a compressed file, for a given signal, the coefficients that are to be manipulated may first be identified. That is, for a particular signal, such as a song, a video, etc., to be embedded in such a manner as to authorize a plurality of unique descendant copies of that signal, a preprocessing step may first complete the necessary psychoacoustic or psychovisual modeling inherent in the embedding process for that signal. In one embodiment, the watermark message may change for each descendant copy. In another embodiment, the key may change for each descendant copy to reflect the uniqueness of a given message. In either case, both the message and the key may be processed so as to reflect any intended differences among the descendant copies.

Of particular interest are those cases in which the psychoacoustic or psychovisual model may be roughly correct for any number of proprietary compression techniques (e.g., MP3, AAC, ePAC, etc. for audio, MPEG for video) and a given signal may need to be prepared so as to enable the watermarking encoder to handle multiple requests for the same signal, but for different compression schemes. The preprocessing step of the present invention provides a "skeleton" of the candidate bits, and eliminates the need to process all of the signal data each time an encoding is performed. Each time a descendant copy is created, the appropriate model (e.g., psychovisual, psychoacoustic, etc.) may be generated for that signal, or a previously saved version of the appropriate model is referenced, and then any concatenation between the model and the particular compression scheme may be matched. Any uniquely-generated descendant copy may differ from other copies in that the keys or messages may change to reflect the difference after watermark(s) have been embedded. One signal may have a plurality of watermarks, which may be a combination of different messages, different encoding keys, and different decoding keys, or key pairs, for each embedded message.

The psychoacoustic model itself may be saved for later handling in the watermark encoding process so as to decrease the requisite time to make every instance of a descendant copy unique for any number of characteristics. These characteristics may include, inter alia, a geographical territory, a transaction identification, an individual identification, a use limitation, a domain, a logical constraint, etc.

The preprocessing of the signal may prepare a key for additional postprocessing in making the key or watermarked signal unique.

Other embodiments and uses of the invention will be apparent to those skilled in the art from consideration of the specification and practice of the invention disclosed herein. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

What is claimed:

1. A system for encoding at least one watermark in a content signal, comprising: a processor for predetermining a number of bits in the content signal to be encoded, based on at least one of a fixed length key and signal characteristics of the content signal; and an encoder for encoding the watermark in the predetermined bits.

2. The system of claim 1, wherein the processor is configured to perform said predetermining and said encoder is configured to perform said encoding.

3. The system of claim 1, further comprising programming stored in machine memory configured to result in said processor performing said predetermining and said encoder performing said encoding.

4. A system for encoding at least one watermark in a content signal, comprising: a processor for locating at least one noise-like signal feature in the content signal; and an encoder for encoding the at least one watermark in substantially the same location as the at least one noise-like signal feature.

5. The system of claim 4, wherein the processor is configured to perform said locating and said encoder is configured to perform said encoding.

6. The system of claim 4, further comprising programming stored in machine memory configured to result in said processor performing said locating and said encoder performing said encoding.

7. A system for encoding at least one digital watermark in a content signal comprising: a processor for measuring a perceived signal-to-error ratio; and an encoder for encoding the at least one watermark in a channel bound by a minimum and maximum signal-to-error level for the content signal.

8. The system of claim 7, wherein the processor is configured to perform said measuring and said encoder is configured to perform said encoding.

9. The system of claim 7, further comprising programming stored in machine memory configured to result in said processor performing said measuring and said encoder performing said encoding.

10. A system for digital watermark encode/decode comprising: a processor for measuring a perceived signal-to-error ratio; and an encoder for encoding at least one watermark in a signal feature that is bound by a minimum and maximum signal-to-error level for a digital signal.

11. The system of claim 10, wherein the processor is configured to perform said measuring and said encoder is configured to perform said encoding.

12. The system of claim 10, further comprising programming stored in machine memory configured to result in said processor performing said measuring and said encoder performing said encoding.

13. A method for detecting watermarks in a digital content signal, comprising: identifying, using a processor, a plurality of signal features in the digital content signal; and detecting, using a processor, watermark data in the identified signal features wherein the identified signal features are identified from relationships between multiple sample windows in the digital content signal.

14. The method of claim 13, wherein the signal features have logical relationships with an analog waveform represented by the digital content signal.

15. The method of claim 13, wherein the signal features comprise mathematical functions of the sample windows.

16. A system for decoding watermarks from a digital content signal, comprising: a processor for identifying a plurality of signal features in the digital content signal; and a decoder for decoding watermark data from the signal features wherein the signal features are identified from relationships between multiple sample windows in the digital content signal.

17. The system of claim 16, wherein the signal features have logical relationships with an analog waveform represented by the digital content signal.

18. The system of claim 16, wherein the signal features comprise mathematical functions of the sample windows.

19. The system of claim 16, wherein the processor is configured to perform said identifying and said decoder is configured to perform said encoding.

20. The system of claim 16, further comprising programming stored in machine memory configured to result in said processor performing said identifying and said decoder performing said encoding.

* * * * *

UNITED STATES PATENT AND TRADEMARK OFFICE
CERTIFICATE OF CORRECTION

PATENT NO.       : 8,281,140 B2
APPLICATION NO.  : 12/592331
DATED            : October 2, 2012
INVENTOR(S)      : Moskowitz It is certified that error appears in the above-identified patent and that said Letters Patent is hereby corrected as shown below:

In column 13 lines 35-40 reading:
"S / E(db) = 10log[(3/2) · sup · 1/2 (2 · sup · n)]· sup· 2

= 10 log(3 /2) + 2 · sup · nlog2

(or " = 20log[(3/2) · sup · 1/2(2 · sup · n)]")

= 6.02n + 1.76"

should read:
-- $S/E(db) = 10\log[(3/2)^{1/2}(2^n)]^2$ $= 10\log(3/2) + 2^{n\log 2}$ (or "$= 20\log[(3/2)^{1/2}(2^n)]$")

$=6.02n+1.76$ --

In column 16 lines 49-51 reading:

"the detection probability of burst errors longer than m+1 bits=l-2 $^{-m\ random\ errors\ up\ to}$ 3 consecutive bits long can be detected."

should read:

-- the detection probability of burst errors longer than m+1 bits=l-2 $^{-m}$ random errors up to 3 consecutive bits long can be detected. --

Signed and Sealed this
Fourth Day of December, 2012

David J. Kappos
*Director of the United States Patent and Trademark Office*

CERTIFICATE OF CORRECTION (continued)
U.S. Pat. No. 8,281,140 B2

In column 19 line 47 reading:

"So, $C''_w(t)$ (an estimate of $C''_v(t)$ given $C''_w(t)$ and $S'_w(t)$)"

should read:

-- "So, $C''_w(t)$ (an estimate of $C''_w(t)$ given $C''_w(t)$ and $S'_w(t)$)" --